(12) United States Patent
Post et al.

(10) Patent No.: US 12,418,540 B2
(45) Date of Patent: Sep. 16, 2025

(54) SYSTEMS AND METHOD FOR MANAGING USER ROLE, SECURITY, AND VERIFICATION

(71) Applicant: American Sports Abroad Media Inc, Millsap, TX (US)

(72) Inventors: Bryan Post, Millsap, TX (US); Luis Angel Resto Hernandez, Huntsville, AL (US); Roger S. Zimmerman, Falmouth, MA (US)

(73) Assignee: American Sports Abroad Media Inc, Millsap, TX (US)

( * ) Notice: Subject to any disclaimer, the term of this patent is extended or adjusted under 35 U.S.C. 154(b) by 301 days.

(21) Appl. No.: 18/324,852

(22) Filed: May 26, 2023

(65) Prior Publication Data
US 2024/0396900 A1 Nov. 28, 2024

(51) Int. Cl.
H04L 9/40 (2022.01)
H04L 67/50 (2022.01)

(52) U.S. Cl.
CPC .......... *H04L 63/104* (2013.01); *H04L 67/535* (2022.05)

(58) Field of Classification Search
CPC .......................... H04L 63/104; H04L 67/535
See application file for complete search history.

(56) References Cited

U.S. PATENT DOCUMENTS

| | | | | |
|---|---|---|---|---|
| 11,245,744 B1* | 2/2022 | Brevoort | ................ | H04L 67/02 |
| 11,810,656 B2* | 11/2023 | Martin | ................ | G16H 20/30 |
| 12,003,426 B1* | 6/2024 | Gregg | ................ | H04L 47/781 |
| 2013/0073359 A1 | 3/2013 | Caplan | | |
| 2015/0379202 A1* | 12/2015 | Plasse | ................ | G16H 10/60 705/51 |
| 2017/0282038 A1 | 10/2017 | Mangold | | |
| 2020/0151838 A1* | 5/2020 | Hoffman | ............ | A63B 24/0059 |
| 2021/0178226 A1* | 6/2021 | Abecassis | .......... | A63B 24/0075 |
| 2021/0201691 A1 | 7/2021 | Lyke et al. | | |
| 2022/0086169 A1* | 3/2022 | Kumar | ................ | H04W 12/65 |

(Continued)

OTHER PUBLICATIONS

International Search Report and Written Opinion dated Aug. 30, 2023, in connection with International Application No. PCT/US23/23727.

*Primary Examiner* — Chris Parry
*Assistant Examiner* — Abderrahmen Chouat
(74) *Attorney, Agent, or Firm* — Wolf, Greenfield & Sacks, P.C.

(57) ABSTRACT

A tracking system may perform authorization, restriction, listing, tracking, and other functions. The system may restrict access to functionality of the system based on various user roles having linkages with authorization attributes specifying different accesses. Users with a first user role make generate tracking objects and users with a second user role may enroll with the tracking objects. Users with the second user role may input progression metrics and verification of the progression metrics. Users with the second user role may receive an engagement score based on interactions of users with a third user role. Furthermore, users with a fourth user role may engage users with the second user role with sponsorships based on the engagement scores. Dependent on user role, the system may present a virtual gate graphical user interface (GUI) preventing some users from accessing functions of the system in visualizations of the GUI.

20 Claims, 16 Drawing Sheets

(56) References Cited

U.S. PATENT DOCUMENTS

2023/0109278 A1\* 4/2023 Shetty .................... G06F 21/31
                                                                    726/7
2024/0339226 A1\* 10/2024 Lucas .................... G16H 20/30

\* cited by examiner

SYSTEMS AND METHOD FOR MANAGING USER ROLE, SECURITY, AND VERIFICATION

TECHNICAL FIELD

The technology of the disclosure relates to management of user role, security, and verification.

BACKGROUND

Millions of individuals participate in athletics throughout the United States and the world, including secondary school and collegiate-level athletics, and in various sports. Team and individual sports may be conducted within official programs offered by educational or other institutions, where athletes may receive coaching and support by individuals designated by these institutions, their fellow athletes, and various sponsoring agencies, such as local businesses, which may provide equipment, publicity, and other forms of support for the athletes.

BRIEF SUMMARY

According to aspects of the disclosure, there is provided a tracking system, the tracking system comprising at least one processor operatively connected to a memory, an authorization component, executed by the at least one processor, configured to accept definitions of user authorization objects for a set of verified users, each user authorization object including a linkage between a user role and a data element specifying an authorization attribute, a restriction component, executed by the at least one processor, configured to identify, based on the user authorization objects, from the set of verified users, a first subset of the verified users having a first user role, the first user role having a linkage with a first authorization attribute specifying an access to generate tracking objects each including one or more progression metrics and responsive to user input in a user interface and based on the user authorization objects, restrict access to functions executed on the system that are configured to generate the tracking objects to the first subset of the verified users having the first user role having the linkage with the first authorization attribute specifying the access to generate tracking objects, a listing component, executed by the at least one processor, configured to responsive to user input in the user interface by the first subset of the verified users having the first user role to which access is restricted, generate tracking objects each including one or more progression metrics and list tracking objects each including one or more progression metrics at a listing index accessible by a second subset of the verified users having a second user role, the second user role having a linkage with a second authorization attribute specifying an access to enroll with tracking objects, and a tracking component, executed by the at least one processor, configured to update tracking objects based on collection of metric values of respective verified users of the second subset of the verified users having the second user role for respective progression metrics.

In some embodiments, restricting access to the functions executed on the system that are configured to generate the tracking objects comprises presenting, in a graphical user interface (GUI), a virtual gate to users not having the first user role, the virtual gate comprising a GUI view configured to obscure, in visualizations of the GUI, access to the functions executed on the system that are configured to generate the tracking objects. In some embodiments, updating tracking objects based on collection of user metrics of respective verified users of the second subset of the verified users having the second user role for respective progression metrics comprises prompting the second subset of the verified users having the second user role to input the metric values for the respective progression metrics and verifying the inputted metric values for the respective progression metrics. In some embodiments, verifying the inputted metric values for the respective progression metrics comprises prompting the second subset of the verified users having the second user role to input videos associated with the inputted metric values and analyzing the inputted videos to validate the inputted metric values. In some embodiments, updating tracking objects based on collection of user metrics of respective verified users of the second subset of the verified users having the second user role for respective progression metrics comprises calculating, based on interactions by a third subset of the verified users having a third user role, an engagement score for the second subset of the verified users having the second user role, wherein the third user role has a linkage with a third authorization attribute. In some embodiments, the tracking component is further configured to present the engagement score for the second subset of the verified users having the second user role to a fourth subset of the verified users having a fourth user role, the fourth user role having a linkage with a fourth authorization attribute, the fourth authorization attribute having a linkage with a respective brand. In some embodiments, the fourth authorization attribute specifies an access for the fourth subset of the verified users having the fourth user role to engage a user of the second subset of the verified users having the second user role to be a brand ambassador of the respective brand. In some embodiments, the authorization component is further configured to generate the user authorization objects for verified users, each user authorization object including the linkage between the user role and the data element specifying an authorization attribute, comprising collecting user credentials indicating a user has an association with an athletic organization and validating the user credentials.

According to aspects of the disclosure, there is provided a method for implementation by a tracking system, the method comprising accepting definitions of user authorization objects for a set of verified users, each user authorization object including a linkage between a user role and a data element specifying an authorization attribute, identifying, based on the user authorization objects, from the set of verified users, a first subset of the verified users having a first user role, the first user role having a linkage with a first authorization attribute specifying an access to generate tracking objects each including one or more progression metrics, responsive to user input in a user interface and based on the user authorization objects, restricting access to functions executed on the system that are configured to generate the tracking objects to the first subset of the verified users having the first user role having the linkage with the first authorization attribute specifying the access to generate tracking objects, responsive to user input in the user interface by the first subset of the verified users having the first user role to which access is restricted, generating tracking objects each including one or more progression metrics, listing tracking objects each including one or more progression metrics at a listing index accessible by a second subset of the verified users having a second user role, the second user role having a linkage with a second authorization attribute specifying an access to enroll with tracking objects, and updating tracking objects based on collection of metric values of respective verified users of the second subset of the verified users having the second user role for respective progression metrics.

In some embodiments, restricting access to the functions executed on the system that are configured to generate the tracking objects comprises presenting, in a graphical user interface (GUI), a virtual gate to users not having the first user role, the virtual gate comprising a GUI view configured to obscure, in visualizations of the GUI, access to the functions executed on the system that are configured to generate the tracking objects. In some embodiments, updating tracking objects based on collection of user metrics of respective verified users of the second subset of the verified users having the second user role for respective progression metrics comprises prompting the second subset of the verified users having the second user role to input the metric values for the respective progression metrics and verifying the inputted metric values for the respective progression metrics. In some embodiments, verifying the inputted metric values for the respective progression metrics comprises prompting the second subset of the verified users having the second user role to input videos associated with the inputted metric values and analyzing the inputted videos to validate the inputted metric values. In some embodiments, updating tracking objects based on collection of user metrics of respective verified users of the second subset of the verified users having the second user role for respective progression metrics comprises calculating, based on interactions by a third subset of the verified users having a third user role, an engagement score for the second subset of the verified users having the second user role, wherein the third user role has a linkage with a third authorization attribute. In some embodiments, the method further comprises presenting the engagement score for the second subset of the verified users having the second user role to a fourth subset of the verified users having a fourth user role, the fourth user role having a linkage with a fourth authorization attribute, the fourth authorization attribute having a linkage with a respective brand. In some embodiments, the fourth authorization attribute specifies an access for the fourth subset of the verified users having the fourth user role to engage a user of the second subset of the verified users having the second user role to be a brand ambassador of the respective brand. In some embodiments, the method further comprises generating the user authorization objects for verified users, each user authorization object including the linkage between the user role and the data element specifying an authorization attribute comprising collecting user credentials indicating a user has an association with an athletic organization and validating the user credentials.

According to aspects of the disclosure, there is provided at least one non-transitory computer-readable storage medium having instructions encoded thereon that, when executed by at least one processor, cause the at least one processor to perform a method of controlling at least one graphical user interface (GUI), the method comprising, responsive to user input in the at least one GUI, generating tracking objects each including one or more progression metrics, listing tracking objects each including one or more progression metrics at a listing index accessible in the at least one GUI by a subset of users, in the at least one GUI, restricting access by the subset of users to a first tracking object of the tracking objects at the listing index, the first tracking object including first one or more progression metrics, the restricting comprising responsive to a determination that required information associated with the first tracking object has not been input, presenting a GUI view configured to prevent, in visualizations of the at least one GUI, access to the first tracking object including the first one or more progression metrics.

In some embodiments, the GUI view configured to prevent, in visualizations of the GUI, access to the first tracking object comprises a virtual gate. In some embodiments, the method further comprises responsive to a determination that the required information associated with the first tracking object has been input, presenting a subsequent GUI view configured to display, in visualizations of the GUI, the first tracking object including the first one or more progression metrics. In some embodiments, the method further comprises determining that the required information associated with the first tracking object has been input based on, in the at least one GUI, receiving user input from a first subset of verified users having a first user role, the first user role having a linkage with an authorization attribute specifying an access to approve tracking objects for listing at the listing index.

BRIEF DESCRIPTION OF DRAWINGS

Various aspects and embodiments of the disclosure will be described with reference to the following figures. It should be appreciated that the figures are not necessarily drawn to scale. Items appearing in multiple figures may be indicated by the same reference number in figures in which they appear.

DETAILED DESCRIPTION

Figure 1:
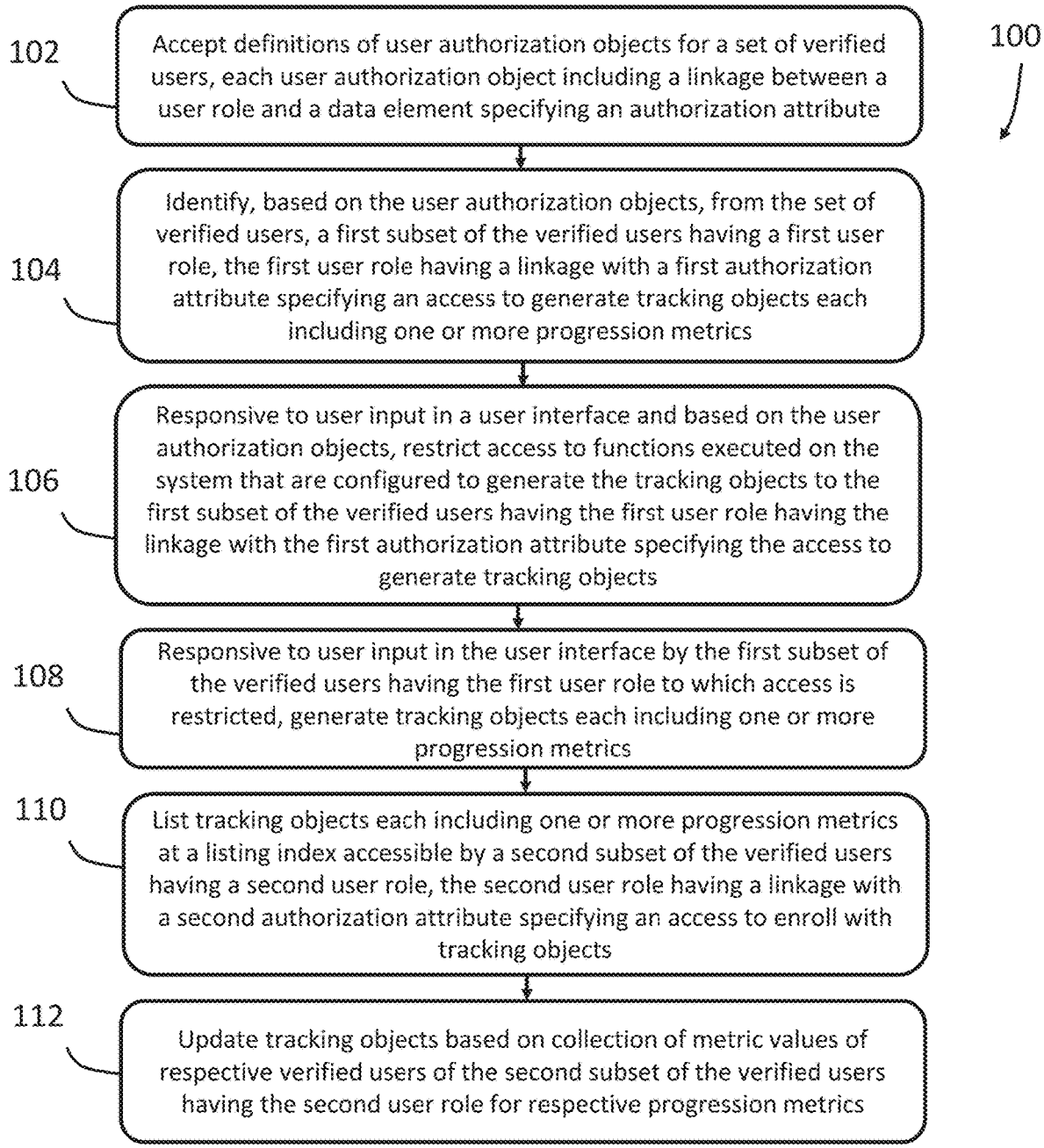
FIG. 1 shows an exemplary process flow of a method of controlling a tracking system.

A tracking system may perform authorization, restriction, listing, tracking, and other functions. The system may restrict access to functionality of the system based on various user roles having linkages with authorization attributes specifying different accesses. Users with a first user role may generate tracking objects and users with a second user role may enroll with the tracking objects. Users with the second user role may input progression metrics and verification of the progression metrics. Users with the second user role may receive an engagement score based on interactions of users with a third user role. Furthermore, users with a fourth user role may engage users with the second user role with sponsorships based on the engagement scores. Dependent on user role, the system may present a virtual gate graphical user interface (GUI) preventing some users from accessing functions of the system in visualizations of the GUI.

The inventors have recognized and appreciated that the passing of the Name Images and Likeness act by the NCAA, as well as other expansions of other revenue sources for athletes, have created new and unprecedented opportunities for young and other athletes. For example, social media may offer substantial opportunities to expand the scope and level of monetary or other support that athletes may receive. The inventors have recognized and appreciated that systems configured to connect potential collegiate athletes with coaches (e.g., anywhere in the world) enables for both athletes and coaches to interact at a level that may not be available in their local geography. According to aspects of the disclosure, digital video technologies, including recorded and live technologies, are used to enhance recruiting opportunities for both coaches and athletes, and primary control may be given to athletes on how they present their image. Furthermore, for coaches, the system may provide access to athletes beyond a coach's geographic region, which enables coaches to better use and target athletes for collegiate recruiting activities, and enables coaches to increase the number of athletes, where those athletes may previously have gone unnoticed under conventional schema.

The inventors have further recognized and appreciated that systems described herein may enable corporate sponsors to connect with athletes, and to make those athletes representatives and brand ambassadors, which may beyond the usual reach available to such businesses under conventional schema. Concomitantly, the system may enable athletes who would usually be limited in their opportunity to represent a brand to local businesses, providing athletes with expanded opportunities using the system connectivity (e.g., provided by social media). In some embodiments, the system may provide similar connections between sports fans, providing and the tracking of athletes by those fans.

The inventors have further recognized that while conventional social media may offer opportunities to connect various individuals, these conventional systems lack the functionality to match athletes to coaches, brands, and fans that are most interested in the athletes' abilities. Accordingly, aspects of the disclosure, provide matching and tracking of athletes. The matching and tracking may be based on objective measures of athletic ability, which the system may determine using statistics for a given sport. Additionally, the system may accept challenges presented by coaches, brands, and fans to athletes to highlight particular abilities of the athletes. The inventors have recognized that there is a lack of connection between the real and social media activities of athletes, brands, coaches and fans. According to aspects of the disclosure, there is provided a tracking system configured to provide a platform for creating, managing, monitoring, scoring, and searching tracking objects for athletes, such as athletic challenges.

According to aspects of the disclosure, a tracking system may execute authorization, restriction, listing, tracking and other components. In various embodiments, the tracking system may manage security and authorization of the system based on verified user roles. For example, the tracking system may store various user authorization objects each including a linkage between a user role and an authorization attribute. Exemplary user roles include athletes, coaches, fans, brands, and administrators. Access to functions executed by the system may be securely managed based on identification of user roles associated with particular users.

According to various embodiments, the tracking system may generate and list tracking objects, which may comprise challenge objects. Each challenge object may include a set of one or more progression metrics specifying an athletic task for athletes to complete. The system may collect metric values of athletes which show progress with respect to the progression metrics. Progression metrics may include completion metrics, where a threshold value is to be achieved by athletes. Advancement along a progression metric or achievement of the threshold completion value for a metric may provide athletes with chances to earn prizes of other rewards, such as brand sponsorships.

In some embodiments, only a subset of verified users of the system having an appropriate user role, may propose or generate challenge objects for athletes to complete. For example, in some embodiments, generation of challenge objects may be limited to administrators. In other embodiments, proposing challenge objects may be allowed by brands or coaches, with administrator approval prior to final listing of the challenge objects.

In some embodiments, after challenge objects are generated and approved, they may be listed at an index, and users having authorization to do so may enroll with the challenge object. Enrolled users may compete in the challenge objects and attempt to show progression with respect to progression metrics. In some embodiments, only a particular subset of uses may be permitted by the system to enroll with the challenge objects. For example, the tracking system may limit challenge object enrollment to users with an athlete user role.

The tracking system may further track completion of challenge objects based on whether enrolled users satisfy progression metrics. For example, the system may prompt users enrolled in the challenge objects to input metric values. The tracking system may then verify the inputted metric values for particular challenge objects. Further, the system may prompt the enrolled users to input verification of the metrics values, for example, using video verification. Image processing such as facial recognition may be performed on the videos to validate progression metrics have been satisfied by the enrolled users.

In some embodiments, the system may calculate an engagement score for a particular subset of users, such as athletes, based on interactions by a different subset of users, such as fans. Furthermore, the tracking system may present the engagement score to an additional subset of users, such as brands, such as to allow the brands to sponsor athletes having high engagement scores as brand ambassadors.

In some embodiments, the tracking system may verify user roles by collecting user credentials of users. For users having an athlete user role, this may include credentials indicating the user has an association with an athletic organization, and for users having a brand role, this may include documents verifying a legal association with the brand.

In some embodiments, the tracking system may generate and present a graphical user interface (GUI), and the GUI is configured to restrict access in the GUI to various functions of the tracking system. For example, the tracking system may identify that a user has a particular user role and may present a virtual gate to users not having an authorized user role. The virtual gate may include a GUI view that prevents access to certain functions of the system, in visualizations of the GUI. Similarly, the GUI may restrict access to challenge objects responsive to a determination that required information associated with the tracking object has not been input. For example, a challenge may be restricted where administrator approval is required for challenge object proposed by a coach or brand to be listed in a challenge index for viewing by athletes.

According to one embodiment, a tracking component of the tracking system can be configured to perform validation of user tasks. For example, the tracking component may include a validation component configured to describe validation processes described herein. In various embodiments, the tracking component may be configured to validate any user submission of evidence of progression metrics or completion metrics, for example, completion of tasks for a challenge. In one example, the user can submit a video of the user performing a task associated with a challenge. The tracking component can be configured to analyze the video and identify specific actions, which may be performed, for example, based on video analysis, segmentation, or recognition. In some examples, where the tracking component is not able to recognize specific tasks in one or more user submitted video or image, a submission by a user may be rejected and the tracking system may then prompt the user to resubmit verification of progression metrics. According to some embodiments, the tracking component can be configured to identify and/or flag issues with progression metric or other evidence capture. In various embodiments, evidence issues might include, among other issues, too blurry, too dark, inability to recognize a face of a user. In some examples, the tracking system can be configured to require that a particular task be identified, and a specific user's face is recognized performing the task, among other options.

According to one embodiment, the tracking component can be configured to recognize and count specific tasks in user supplied videos, images, or other media submissions. In some examples, the tracking component is configured to access social media platforms and streams or recordings of challenge tasks, among other sources of validation information. The tracking component can be configured for a number of validation levels where a rigor of the validation is adjusted according to a level specified by an originator of the challenge task or an administrator of the tracking system. For example, a high level validation may require facial recognition coupled with activity recognition for the submitted evidence, for each action that comprises a challenge task. A lower validation level may only require activity recognition and alignment with a user profile or other known information. A still lower level of validation may only require some activity recognition that matches a task. In some embodiments, a validation level can be defined by a challenge creator, submitter, and/or sponsor, among other options. In various embodiments, metrics for validation may include age and sex of athletes, known realistically achievable values or predicted achievable values for the athletes, or realistic upper limits for metrics specified by challenged creators or submitters. The system may determine known realistically achievable values or predicted achievable values for the athletes using athletic records or comparison with other metrics, including an athlete's history. In some embodiments, the system may use statistical techniques, (for example, that correlate the achievement of some athletics tasks with others) to predict achievable values.

According to some embodiments, the tracking component and the respective validation level may also be tailored to a degree of completion shown or recognized in user submitted evidence. For example, if a majority of a task is recognized and a particular user is recognized, the tracking system may be configured to validate the task based on recognition of the majority of the task, which may further be based on validation information including content that is not recognized within the validation information, among other options.

According to one embodiment, challenge objects may include options to forgo complete recognition based reduced quality validation information. For example, reduced quality validation information may include poorly captured evidence, for example, images or videos. In one example, a user submission may not be verified or may not be verified to a required threshold, but the tracking system may nonetheless present the user with an option of having the submission count regardless of the failed validation. In some embodiments, this failed validation may be presented as a limited option, for example, a one-time option elected by the user. The tracking system can maintain a record of any such elections and provide visual indicators to reflect use or status of such user elections. According to some embodiments, the limited option to give users an election with respect to evidence may be based on a validation level, or may be specified separately by a challenge creator, submitter, and/or sponsor. According to some examples, the tracking system may maintain separate authorization for each validation feature, where a challenge creator can specify validation level, submission forgiveness election, among other options. In further example, the system may maintain a different set of authorizations for a challenge submitter, an ability to set validation level, an ability to set submission forgiveness election, among other options. In still other examples, tracking the system may maintain another set of authorizations for a challenge sponsor, among other options.

Particular exemplary embodiments of a tracking system and associated user interfaces are now described. FIG. 1 shows an exemplary process flow 100 of a method of controlling a tracking system, which may be performed by a computer system, such as the exemplary computer systems described herein. Process flow 100 includes act 102, act 104, act 106, act 108, act 110, and act 112. At act 102 of process flow 100, the computer system may perform steps of accepting definitions of user authorization objects for a set of verified users, each user authorization object including a linkage between a user role and a data element specifying an authorization attribute. At act 104 of process flow 100, the computer system may perform steps of identifying, based on the user authorization objects, from the set of verified users, a first subset of the verified users having a first user role, the first user role having a linkage with a first authorization attribute specifying an access to generate tracking objects each including one or more progression metrics. At act 106 of process flow 100, the computer system may perform steps of responsive to user input in a user interface and based on the user authorization objects, restricting access to functions executed on the system that are configured to generate the tracking objects to the first subset of the verified users having the first user role having the linkage with the first authorization attribute specifying the access to generate tracking objects. At act 108 of process flow 100, the computer system may perform steps of responsive to user input in the user interface by the first subset of the verified users having the first user role to which access is restricted, generating tracking objects each including one or more progression metrics. At act 110 of process flow 100, the computer system may perform steps of listing tracking objects each including one or more progression metrics at a listing index accessible by a second subset of the verified users having a second user role, the second user role having a linkage with a second authorization attribute specifying an access to enroll with tracking objects. At act 112 of process flow 100, the computer system may perform steps of updating tracking objects based on collection of metric values of respective verified users of the second subset of the verified users having the second user role for respective progression metrics.

Figure 2:
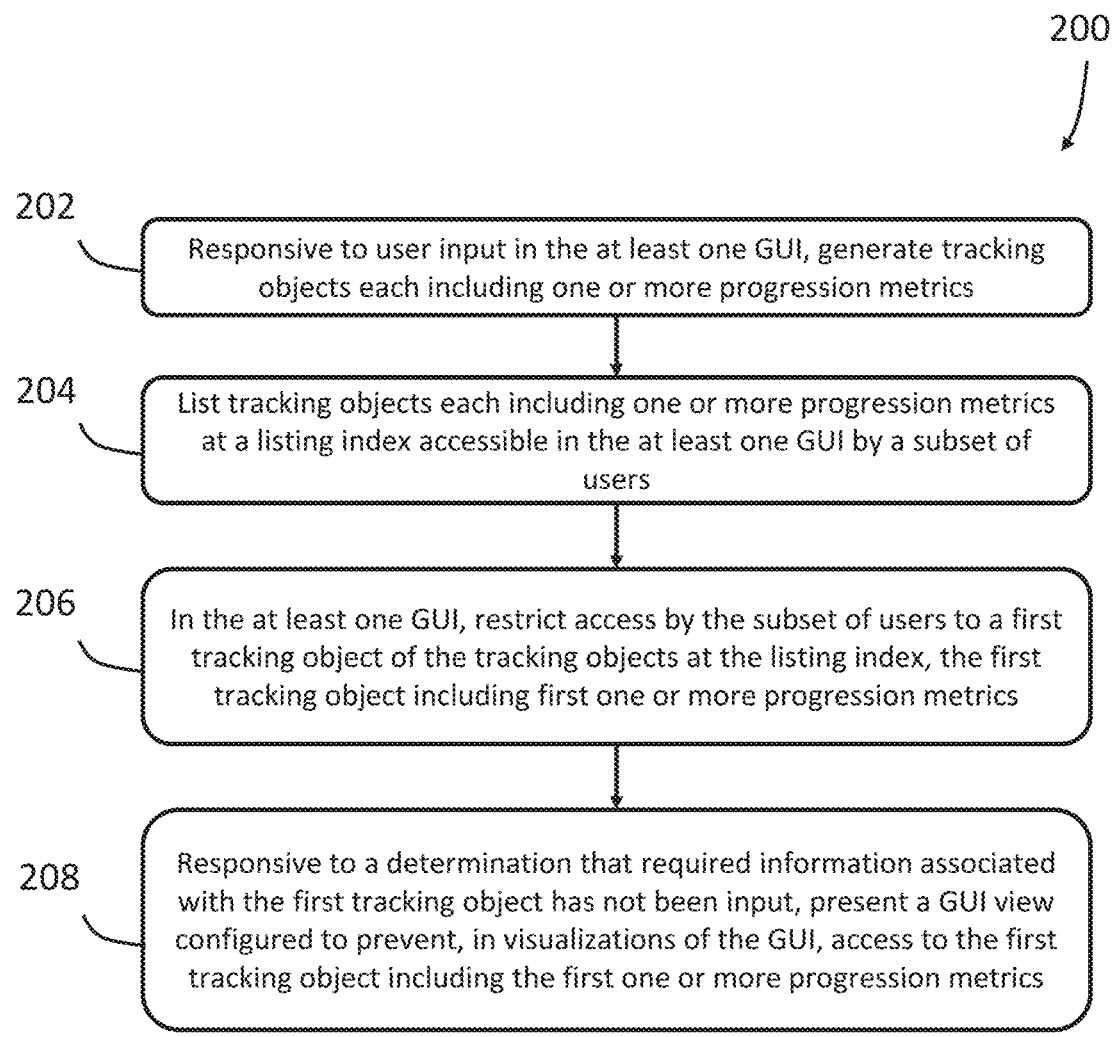
FIG. 2 shows an exemplary process flow of a method of controlling a graphical user interface (GUI)

FIG. 2 shows an exemplary process flow 200 of a method of controlling a graphical user interface (GUI), which may be performed by a computer system, such as the exemplary computer systems described herein. Process flow 200 includes act 202, act 204, act 206, and act 208. At act 202 of process flow 200, the computer system may perform steps of responsive to user input in the at least one GUI, generating tracking objects each including one or more progression metrics. At act 204 of process flow 200, the computer system may perform steps of listing tracking objects each including one or more progression metrics at a listing index accessible in the at least one GUI by a subset of users. At act 206 of process flow 200, the computer system may perform steps of in the at least one GUI, restricting access by the subset of users to a first tracking object of the tracking objects at the listing index, the first tracking object including first one or more progression metrics. At act 208 of process flow 200, the computer system may perform steps of responsive to a determination that required information associated with the first tracking object has not been input, presenting a GUI view configured to prevent, in visualizations of the GUI, access to the first tracking object including the first one or more progression metrics.

Figure 3:
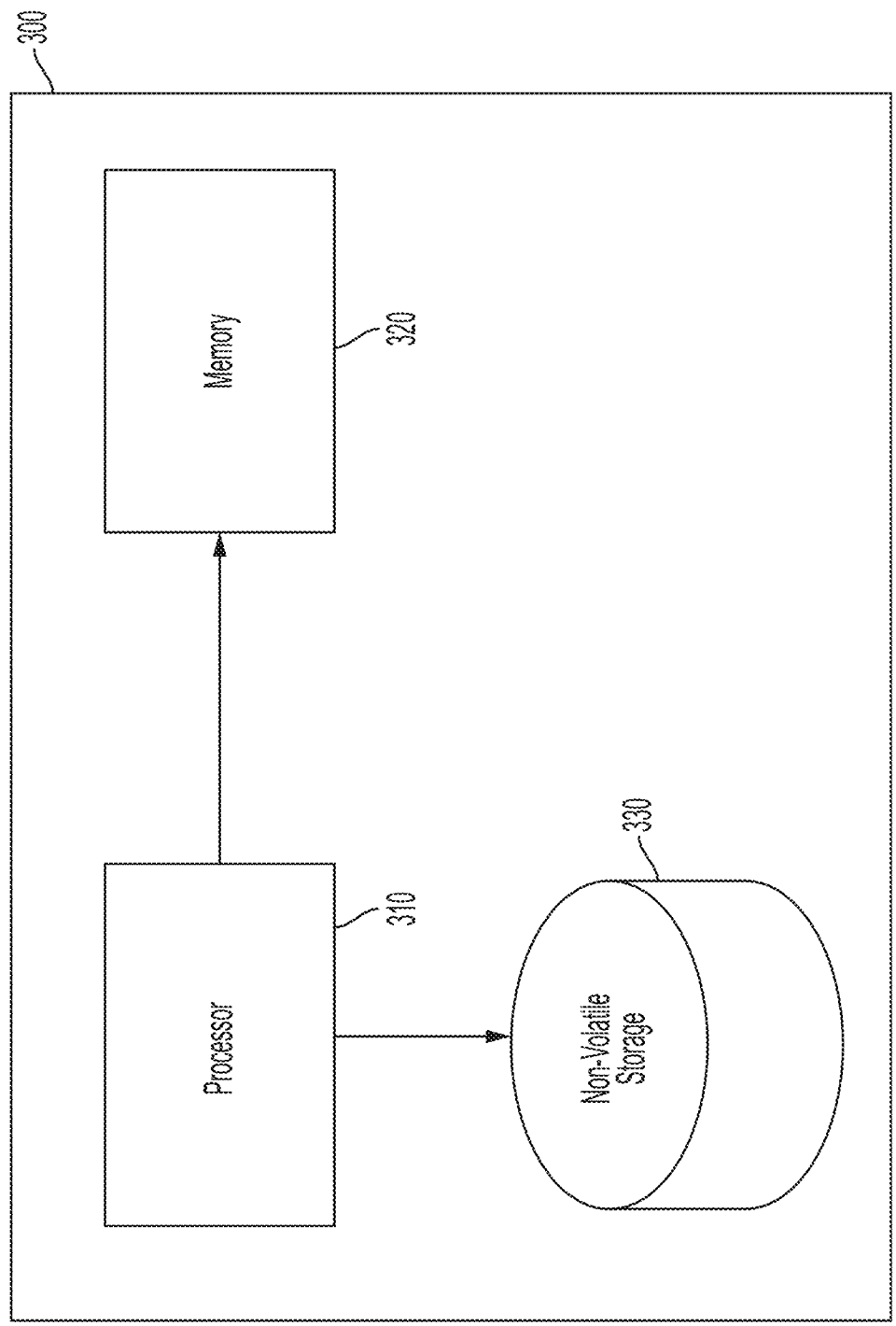
FIG. 3 shows an exemplary block diagram of a special purpose computer system that can be improved over conventional implementations based on implementations and/or execution of methods discussed herein.

Various functions described herein may be performed by computer systems. Referring to FIG. 3, there is illustrated a block diagram of a specially configured distributed computer system 300, in which various aspects and functions are practiced. As shown, the distributed computer system 300 includes one or more computer systems that exchange information. More specifically, the distributed computer system 300 includes computer systems 302, 304, and 306. As shown, the computer systems 302, 304, and 306 are interconnected by, and may exchange data through, a communication network 308. The network 308 may include any communication network through which computer systems may exchange data. To exchange data using the network 308, the computer systems 302, 304, and 306 and the network 308 may use various methods, protocols and standards, including, among others, Fiber Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 302, 304, and 306 may transmit data via the network 308 using a variety of security measures including, for example, SSL or VPN technologies. While the distributed computer system 300 illustrates three networked computer systems, the distributed computer system 300 is not so limited and may include any number of computer systems and computing devices, networked using any medium and communication protocol.

As illustrated in FIG. 3, the computer system 302 includes a processor 310, a memory 312, an interconnection element 314, an interface 316 and data storage element 318. To implement at least some of the aspects, functions, and processes disclosed herein, the processor 310 performs a series of instructions that result in manipulated data. The processor 310 may be any type of processor, multiprocessor, or controller. Example processors may include a commercially available processor such as an Intel Xeon, Itanium, Core, Celeron, or Pentium processor; an AMD Opteron processor; an Apple A10 or A5 processor; a Sun Ultra-SPARC processor; an IBM Power5+ processor; an IBM mainframe chip; or a quantum computer. The processor 310 is connected to other system components, including one or more memory devices 312, by the interconnection element 314.

The memory 312 stores programs (e.g., sequences of instructions coded to be executable by the processor 310) and data during operation of the computer system 302. Thus, the memory 312 may be a relatively high performance, volatile, random access memory such as a dynamic random access memory ("DRAM") or static memory ("SRAM"). However, the memory 312 may include any device for storing data, such as a disk drive or other nonvolatile storage device. Various examples may organize the memory 312 into particularized and, in some cases, unique structures to perform the functions disclosed herein. These data structures may be sized and organized to store values for particular data and types of data.

Components of the computer system 302 are coupled by an interconnection element such as the interconnection mechanism 314. The interconnection element 314 may include any communication coupling between system components such as one or more physical busses in conformance with specialized or standard computing bus technologies such as IDE, SCSI, PCI, and InfiniBand. The interconnection element 314 enables communications, including instructions and data, to be exchanged between system components of the computer system 302.

The computer system 302 also includes one or more interface devices 316 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 302 to exchange information and to communicate with external entities, such as users and other systems. In some embodiments, an interface device 316 may present one or more graphical user interfaces (GUIs) to users. A GUI presented by interface device 316 may provide various outputs described herein to users and may further accept various input described herein from users.

The data storage element 318 includes a computer readable and writeable nonvolatile, or non-transitory, data storage medium in which instructions are stored that define a program or other object that is executed by the processor 310. The data storage element 318 also may include information that is recorded, on or in, the medium, and that is processed by the processor 310 during execution of the program. More specifically, the information may be stored in one or more data structures specifically configured to conserve storage space or increase data exchange performance. The instructions may be persistently stored as encoded signals, and the instructions may cause the processor 310 to perform any of the functions described herein. The medium may, for example, be optical disk, magnetic disk, or flash memory, among others. In operation, the processor 310 or some other controller causes data to be read from the nonvolatile recording medium into another memory, such as the memory 312, that allows for faster access to the information by the processor 310 than does the storage medium included in the data storage element 318. The memory may be located in the data storage element 318 or in the memory 312, however, the processor 310 manipulates the data within the memory, and then copies the data to the storage medium associated with the data storage element 318 after processing is completed. A variety of components may manage data movement between the storage medium and other memory elements and examples are not limited to particular data management components. Further, examples are not limited to a particular memory system or data storage system.

Although the computer system 302 is shown by way of example as one type of computer system upon which various aspects and functions may be practiced, aspects and functions are not limited to being implemented on the computer system 302 as shown in FIG. 3. Various aspects and functions may be practiced on one or more computers having a different architectures or components than that shown in FIG. 3. For instance, the computer system 302 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 302 may be a computer system including an operating system that manages at least a portion of the hardware elements included in the computer system 302. In some examples, a processor or controller, such as the processor 310, executes an operating system. Examples of a particular operating system that may be executed include a Windows-based operating system, such as, Windows NT, Windows 2000 (Windows ME), Windows XP, Windows Vista or Windows 7, 8, or 11 operating systems, available from the Microsoft Corporation, a MAC OS System X operating system or an iOS operating system available from Apple Computer, one of many Linux-based operating systems distributions, for example, the Enterprise Linux operating system available from Red Hat Inc., a Solaris operating system available from Oracle Corporation, or a UNIX operating systems available from various sources. Many other operating systems may be used, and examples are not limited to any particular operating system.

The processor 310 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML, or other formats, when viewed in a window of a browser program, can render aspects of a graphical-user interface, or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture or programming language.

According to aspects of the disclosure, tracking systems described herein may manage user role, security, and verification using at least five distinct user roles, which may, among other roles, include an administrator role, an athlete role, a brand role, a coach role, and a fan role. In some embodiments, the system may authenticate an identity of the user to assign a user to a role. For example, the system may require a user to input identifying information such as a name or address, or may require input of a user credential, such as a driver's license or other form of ID. Some roles, such as fan roles, may not require a user to input identifying information. Responsive to identifying a user, the system may assign the user a role.

In some embodiments, a user may be assigned an administrator role. A user with an administrator role may be provided by the system with overall administrative responsibility and authority over the tracking system, and may be prompted with validating challenges, approving recruitment, and managing prizes and payments. In some embodiments, one or more administrators may be assigned to one or more brands.

In some embodiments, a user may be assigned an athlete role. A user with an athlete role may be provided by the system with controls for enrolling and participating in challenges, joining teams, engaging with coaches, fans, brands, and other athletes, and receiving or giving payments.

In some embodiments, a user may be assigned a brand role. A user with a brand role user may be provided by the system with controls for organizing and monitoring challenges, engaging with athletes to represent a brand entity linked with the brand role, and granting prizes and payments.

In some embodiments, a user may be assigned a coach role. A user with a coach role may be provided by the system with controls for organizing and monitoring challenges, recruiting athletes, managing teams, and engaging with athletes to provide athletic advice and support.

In some embodiments, a user may be assigned a fan role. A user with a fan role may be provided by the system controls for monitoring challenges, engaging with athletes, and supporting athletes with prizes and payments, Furthermore, the tracking system may define various objects, including team objects, brand ambassador objects, tracking objects (which may comprise challenge objects), and achievement objects. For example, a team object may define a team and link one or more athletes with a same coach. In some embodiments, a brand ambassador object may be linked with an athlete and may indicate that the athlete has formally engaged with a brand to represent that brand as a brand ambassador. In various exemplary embodiments, athletes may be referred to as brand ambassadors, irrespective of whether they have yet established a relationship, which may encourage athletes to join the tracking system. A tracking object may comprise a challenge object. A challenge object may include a set of progression metrics, which may include one or more measurable athletic skills, in which one or more athletes may enroll and participate. The tracking system may then track particular measurements that have been achieved by each athlete for the purpose determining whether the progression metrics have been completed. The tracking system may further track motivation, and coach and/or brand identification for athletes. An achievements object may provide a GUI element on an athlete profile, which may be displayed as a badge. Athletes may earn achievements objects by enrolling and participating with one or more challenge objects.

In various embodiments, one or more or all users, user roles, and objects, may be maintained in one or more database, such as a relational database, such as MySQL or SQLServer. Maintaining users, user roles, and objects in the database may allow the tracking system to implement functionalities by creating, deleting, or modifying relationships and field values in the database, and then accessing displaying those relationships and field values to render associated data and functionality in various GUIs of the tracking system.

According to aspects of the disclosure, in order to enhance security of the tracking system, the tracking system may limit GUIs presented to users based on a user role linked with the user. In some embodiments, each user role has a distinct set of GUIs providing a view into the database relationships and field values, so that controls provided based on user roles may be supported by data and security architecture provided herein. For example, the tracking system may offer client interactions that can be presented multiple different applications, for example, five applications, one for each user role.

In some embodiments, a Users table may at least contain the following fields which include objects linked with each user. ID: a unique user ID. Name: a name of the user. Role: a role linked to the user for example, athlete, coach, brand, fan, administrator. LoginName: A unique login name for the user, for example a user's unique email address may be provided. Date of birth. In some embodiments, this field may be used by the tracking system to validate that a user is old enough to participate with the tracking system and/or to provide special promotions, such as promotional awards to the user on a birthday, holiday, or other date. Narrative: an open text field that may indicate a reason/motivation of the user for registering with the tracking system. Description: an open text field provided to the user. For example, the user may create or update a description to displayed on various to present the user's persona to an audience. FavoriteSports: a list, for example, created from a multi-select menu, of the sports (and, as a result, the challenges associated with those sports) that the user is interested in tracking and/or enrolling and participating in. UserAccepted: a Boolean field indicating that a user has been accepted to the tracking system. UserAcceptedAt: a DateTime field indicating a timestamp when a user was accepted. DisclaimerAccepted: a Boolean field indicating that a user has accepted a disclaimer presented, for example, after the registration screen has been filled out and submitted. DisclaimerAcceptedAt: a DateTime field indicating a timestamp when a disclaimer was accepted. EncryptedPassword: a secure representation of a user's password.

In some embodiments, a user may request and/or be linked with a user role. When a user registers with the tracking system, the user is prompted with a prompt to identify a user role the user wishes to be linked with. In some embodiments, the user may not proceed without selecting a user role. The user role may be selected by various GUI elements, for example, using a pull-down menu containing a list of user roles. Each identification of a user role is configured to link a registering user with an authorization object that provides the user with a set of security permissions associated with the linked user role.

In some embodiments, a user may be verified using the tracking system. After a user requests registration, and before the user has full access to the tracking system, an administrator of the tracking system may verify the user. For example, verification may ensure that a user requested a correct user role during registration. The tracking system may automatically perform verification of users, and user roles. For example, the tracking system may automatically send e-mails to a registering user's e-mail address and request return verification using the sent e-mail. In some embodiments, the tracking system may request credentials from a user, such as a driver's license or other form of ID, or may request user relationship documentation, for example documentation such as contracts indicating that a user is associated with a particular brand. In further embodiments, the tracking system is configured to search and capture data on a registering user, for example, by executing a web search on a university athletic website, a professional association website, such as LinkedIn, other web searches. In some embodiments, the tracking system may capture and verify other authentication information from registering users. In various embodiments, the tracking system may validate school enrollment information. In some embodiments, the system may prevent a user from continuing registration if any of the above verification information is not submitted.

The tracking system may match a user to a user role based on information submitted by the user and/or based on information collected by the tracking system. The tracking system may be configured to match information between registering users and agency or other data, and may be configured to trigger alerts, alarms, or other notifications if a registering user has entered a different user role than should be assigned to the user. In such situations, the user may be denied from being linked with the different user role.

Figure 4:
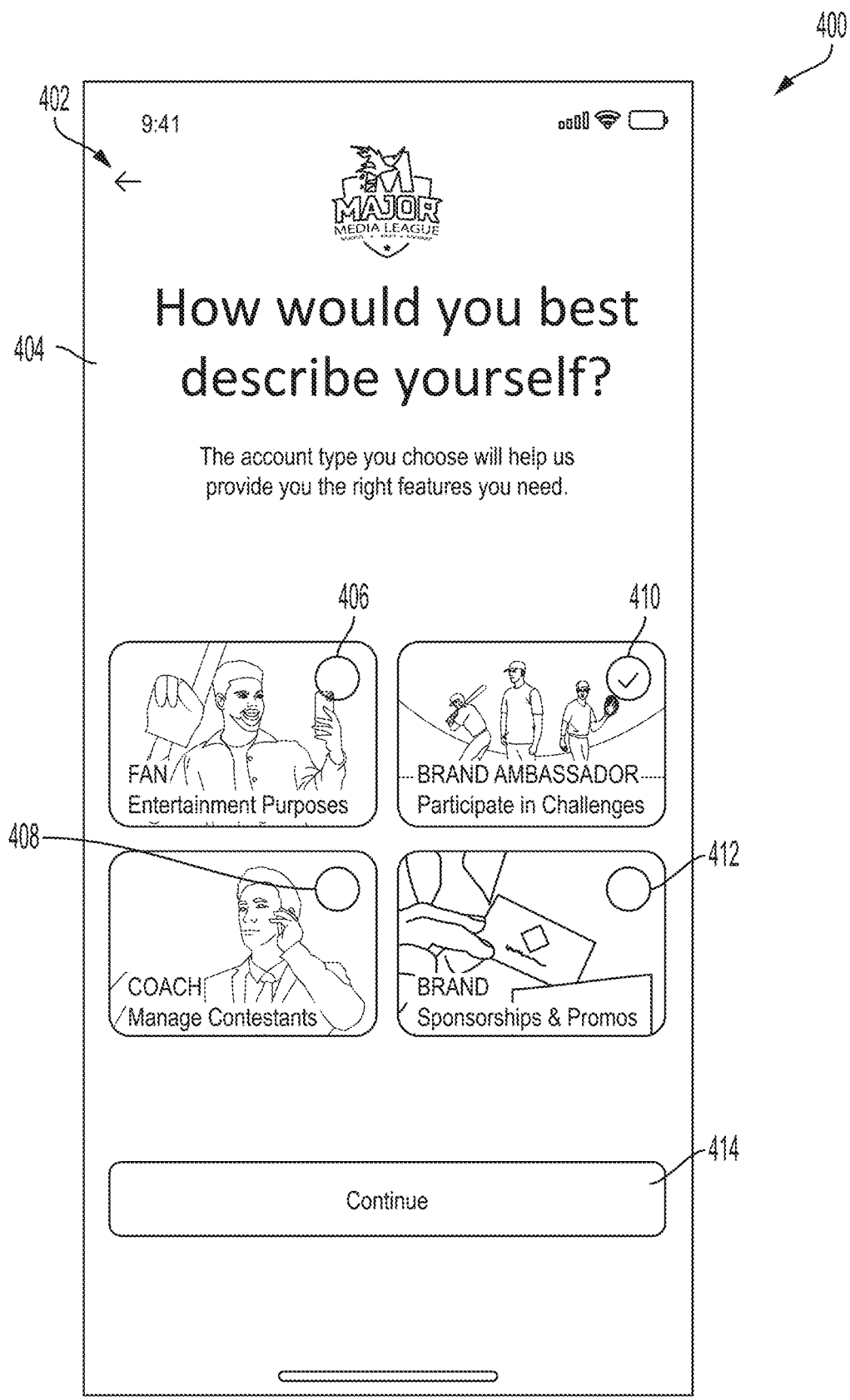
FIG. 4 shows an exemplary embodiment of a GUI.

An example registration interface is described with respect to FIG. 4. FIG. 4 shows an exemplary embodiment of a GUI 400, which may be a user role enrollment GUI displayed using a computer system such as exemplary computer system 300. GUI 400 includes a GUI element 402, a GUI element 404, a GUI element 406, a GUI element 408, a GUI element 410, a GUI element 412, and a GUI element 414.

In some embodiments, GUI element 402 is configured to take a user to a previous GUI, which may be an element prompting users without an account to sign up. GUI element 404 may comprise an element that prompts users with information regarding user roles. In some embodiments, GUI elements 406, 408, 410, and 412 may comprise user role selection elements, with GUI element 406 configured to present users with a GUI associated with a fan user role, GUI element 408 configured to present users with a GUI associated with a coach user role, GUI element 410 configured to present users with a GUI associated with a brand ambassador user role, and GUI element 412 configured to present users with a GUI associated with a brand user role. GUI element 414 may be a selection element configured to present users with a user role GUI once they have selected one of the GUI elements 406, 408, 410, and 412 associated with the various user roles.

In some embodiments, the tracking system may provide a user profile. Information entered by a user into various GUIs described herein may be updated by presenting similar GUIs to the user at a time after the information was originally entered. For example, a user may have access to a profile GUI where the user may update user information provided when the user first registered for the tracking system. In some embodiments, a user may use update functions to change a Login_name to a different, but still unique, email address. In some embodiments, the tracking system may prevent certain fields from being updated. For example, the tracking system may not allow a user to change their own user role, for example, from coach to fan, or their displayed name, such changes may be considered fraudulent activity by the tracking system.

The tracking system may use the Narrative field to provide an administrator with information that may be used to validate a user's participation with the tracking system. For example, users associated with an athlete user role may be prompted to provide a paragraph stating why they would like to be part of the tracking system and may be prevented from completing registration without such a paragraph. Athletes may also be prompted to enter other social media handles and may be prevented from completing registration without doing so. Collecting social media information of athletes may provide the tracking system with information used to activate social tracking and ranking features, which may provide athletes with an appropriate on their profile.

Registering users may be virtually gated with a disclaimer GUI. For example, after a user has been accepted, for example, the UserAccepted Boolean and UserAcceptedAt timestamp are set, login by the user may be virtually gated by a disclaimer GUI. A disclaimer GUI may present the user with information about how the tracking system may expose user personal information to other users and may prevent users from accessing further GUIs until the user agrees to the information disclosures. The disclaimer GUI may include various selectable GUI elements that a user may select to indicate acceptance of disclaimers, for example, a checkbox to indicate user acceptance. When a user accepts the disclaimers, the DisclaimerAccepted and DisclaimerAcceptedAt fields may be set on a user record. Once these fields are set, future login attempts may not request further disclaimer acceptance.

Users logged in to the tracking system may be provided by the tracking system with functions authorized for a user role linked to the user. For example, when a user logs in, for example, a LoginName and associated password, they assume a user role linked to that user. Within the tracking system, user functions may be virtually gated based on authorization objects associated with respective user roles. The authorization objects may, for each user role, delimited capabilities the tracking system provides to that user role. In some embodiments, the tracking system may present, via one or more GUIs, a different color and styling scheme, for example, using different CSS templates, for each user role. In some embodiments, different users are virtually gated to access to different GUIs and thereby different authorized functions when interacting with the tracking system, The tracking system may virtually gate users responsive to identifying user roles.

According to some embodiments, exemplary relational database schema is provided. For team objects, there may be ID: providing a unique team ID; Name: providing a name of the team; Coach_ID: providing a Foreign_key reference to Users_ID of a user with a user role of coach with ownership and/or control of the team.

For challenge objects, there may be ID: providing a unique challenge ID; Sport: providing a particular sport, for example, as a string or Sport_id, with reference to a Sports table, in which the challenge is categorized, and, in some embodiments, only athletes and coaches that are associated with a respective sport may enroll, participate in, or monitor a challenge linked with the respective sport; Title: providing a name of a challenge; Description: providing an explanation of what is involved in the challenge; Sponsor_id: providing a Foreign_key reference into the Users_ID of the user with the user role administrator, coach, brand, or fan sponsoring the challenge; End_date: providing a DateTime when the challenge is configured to complete; Active: a Boolean indicating if a challenge is currently active; Challenge_prizes: providing awards, such as digital tokens, monetary aways, and/or brand opportunities, which are available to athletes who advance along progression metrics for the challenge.

Team_members may provide a join between users who have a user role of athlete and the Teams table, and associated with Team_members, there may be ID: providing a unique ID; Team_id: providing a Foreign_key into the Teams table; Athlete_id: providing a Foreign_key into the Users table to a user with the user role athlete that is on the team.

Challenge_metrics may provide joins with challenges to comprise the list of measures that are tracked in the challenge, and associated with Challenge_metrics, there may be ID: providing a unique Challenge_metrics ID; Metrics Name: providing a name of a metric, for example, a skill such as fastball speed or free throw percentage; Challenge_id: providing a unique identifier of a challenge; Video: providing a Boolean to indicate that a challenge is conducted using video uploads, or real-time video, provided by athletes; Goal: providing a target value for a progression metric, which in some embodiments, may be an optional field, as for example, for video-driven challenges a progression metric not be set; Target_minimum: providing a threshold value of the progression metric which is to be exceeded by the challenge participating athlete in order to qualify for participation in the challenge, which may in some embodiments be an optional field.

Athlete_challenge_metrics may provide tracking of all of an athlete's entries for metrics of challenges in which the athlete is participating, and assocaited with Athlete_challenge_metrics, there may be ID; Challenge_metrics_id; Athlete_id; Value; providing a specific metric value; Date: providing a timestamp at which the metric value was created; Validated: providing a Boolean to indicate that a metric value has been approved for example, by an administrator.

Athlete_challenge_videos may, for video-driven challenges, provide a table to track video uploads, and associated with Athlete_challenge_videos, there may be ID; Challenge_ metric_id; Athlete_id; Video_location: providing a storage location for the uploaded video, for example, a URL to an AWS S3 file; Date; Validated.

Athlete_challenge_engagement_metrics may provide tracking of engagement metrics for each athlete participating in a challenge, and associated with Athlete_challenge_engagement_metrics, there may be ID; Challenge_id; Athlete_id; Engagement_metrics: for example, a JSON hash containing statistics on Likes, Shares, Comments, Views, Hearts, and incoming traffic links.

Challenge_standings may provide tracking of all athletes involved in each challenge, including athlete scores, which may be derived from the relevant metrics and the ranking algorithm, and an athlete rank, and associated with Challenge_standings, there may be ID; Challenge_id; Athlete_id; Athlete_score; Athlete_rank Brand_ambassadors: may provide a join table between users with a user role athlete and users with a user role brand, which may indicate that a particular athlete is an ambassador that brand, or that the brand is a sponsor for the athlete. Associated with Brand_ambassadors, there may be ID; Athlete_id; Brand_id; Awards; Created_at.

User_digital_wallet may provide an entry per user of information needed to interact with an external blockchain-driven system, and associated with User_digital_wallet, there may be ID; User_id; Public_key; Private_key, which may be stored encrypted.

In various embodiments, the tracking system may track users using tracking objects, each tracking object having one or more associated progression metrics. In some embodiments, a tracking object may comprise an athletic challenge for users having an athlete user role. For example, administrators may create challenges. In some embodiments, challenges may be proposed by coaches or brands and then approved by administrators. In various embodiments, athletes may enroll and participate with challenge objects, which may be subject to approval by coaches, brands and/or administrators. Challenge objects may comprise one or more progression metrics, which may include a set of one or more video submissions and/or a set of one or more measured challenge metrics. As noted above, a progression metric may comprise a completion metric, where a threshold value for the metric is to be completed by the athlete.

In some embodiments, an administrator may create a challenge object. Fields associated with a challenge object may be validated by the tracking system, for example, using an GUI that is virtually gated to be accessed by users having a user role of administrator, and not by other users. An administrator GUI for generating challenges may ensures all appropriate fields, for example, Title, Description, prizes, metrics, etc., are filled in appropriately. In some embodiments the tracking system may automatically validate field entries. In other embodiments, for example, for challenges proposed by users having a user role of brand, other methods of validation of proposed challenges are used by the tracking system. Returning to the administrator challenge embodiment, prizes for a challenge, for example, with a first, second, and third prize, may be provided by an owner of the tracking system, for example, who may be represented by an administrator, brands, coaches, or a combination thereof.

In some embodiments, a challenge generated by an administrator may be sponsored by a user have a different user role. For example, the challenge may be sponsored by brands and/or coaches. When challenges are sponsored, the tracking system may arrange collaboration between users, for example, via messaging and transfer of prizes, such as digital tokens, from a sponsor's account.

In some embodiments, generation of a challenge object may be proposed by user having a brand user role. As one example, a running shoe manufacturer may propose a challenge where athletes are to run 100 miles or more in a month. In this example, an athlete must run at least 100 miles in the next month in order to qualify for ranking in the challenge.

Figure 5:
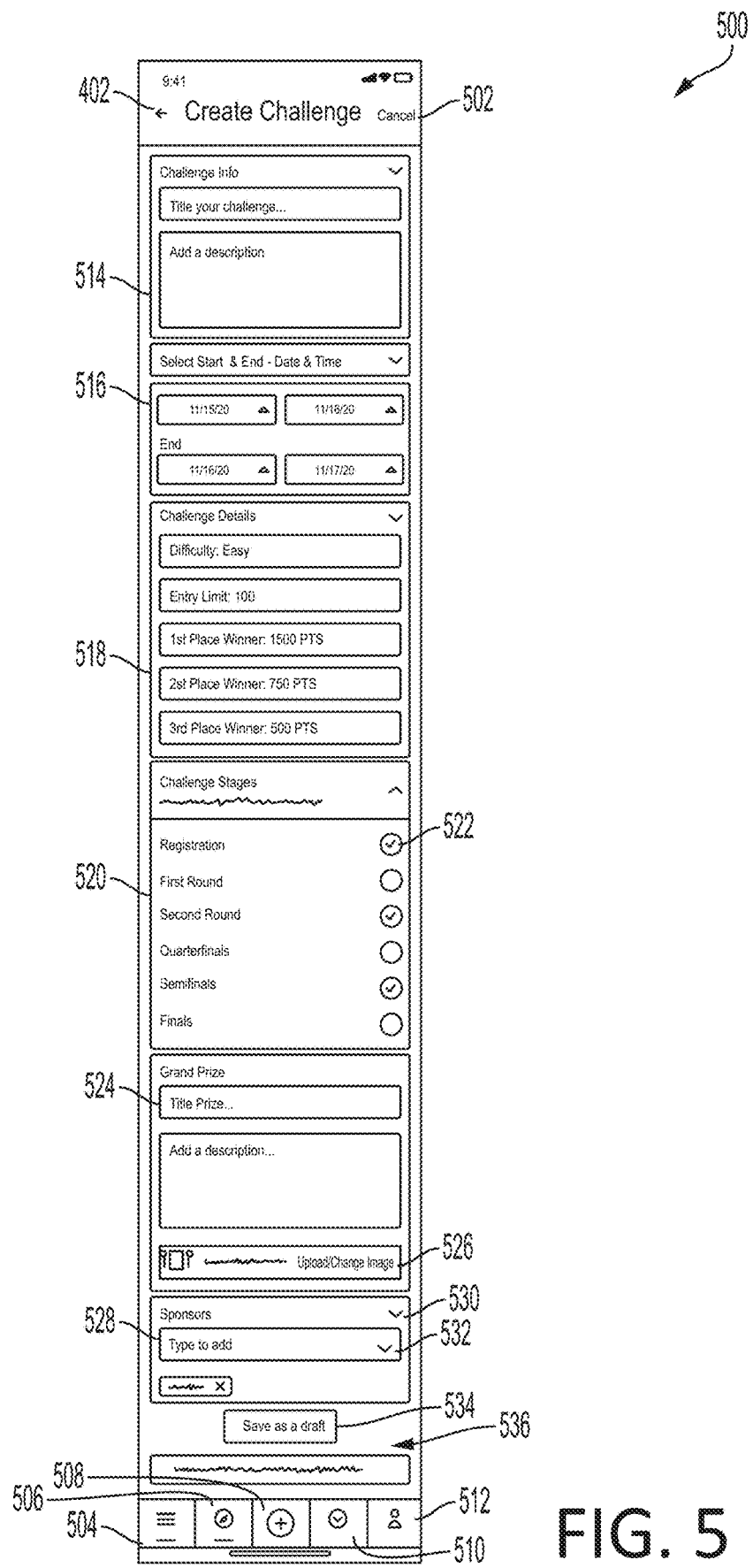
FIG. 5 shows an additional exemplary embodiment of a GUI.

An exemplary GUI configured for user by a user having a brand user role to generate a challenge is described with respect to FIG. 5. FIG. 5 shows an exemplary embodiment of a GUI 500, which may be a tracking object generation GUI displayed using a computer system such as exemplary computer system 300. GUI 500 includes a GUI element 402, a GUI element 502, a GUI element 504, a GUI element 506, a GUI element 508, a GUI element 510, a GUI element 512, a GUI element 514, a GUI element 516, a GUI element 518, a GUI element 520, a GUI element 522, a GUI element 524, a GUI element 526, a GUI element 528, a GUI element 530, a GUI element 532, a GUI element 534, and a GUI element 536.

In some embodiments, GUI element 502 is configured to close the GUI screen 500 and take a user to a previous GUI. Collectively comprising a coach navigation element, GUI element 504 may be configured to open a side menu, GUI element 506 may be configured to open a coach home, GUI element 508 may be configured to open a coach create GUI, GUI element 510 may be configured to open a coach GUI for a forum, and GUI element 512 may be configured to open a coach profile GUI. In some embodiments, GUI element 514 presents a challenge information element which may present challenge title and description. GUI element 516 may be configured to present a challenge start and end time. In some embodiments, GUI element 518 is configured to present challenge details including a difficulty, an entry limit, and points values, for example for first, second, and third place winners. GUI element 520 may be configured to present challenge stages including first second, or further rounds, and finals stages such as quarterfinals, semifinals, and finals. In some embodiments, GUI element 522 may be a toggle element configured to allow a user to select stages. GUI element 524 may comprise a prize element presenting a title and a description. In some embodiments, GUI element 526 presents an element for a user to upload a prize image. GUI element 528 may be configured to provide a sponsor element for the challenge. GUI element 530 may be configured to collapse or open sections, and GUI element 532 may be configured to add a new sponsor. In some embodiments, GUI element 534 may save a draft challenge proposal and a GUI element 536 may submit a challenge proposal for approval.

When a challenge object or proposed challenge object is generated, a challenges record may be inserted in a database. Exemplary values according to one embodiment include ID: 478923; Title: Running Distance Challenge; Description: run more than 100 miles in a month; Sponsor_id: a User_id of the running shoe manufacturer; End_date: one month from now; Active: false; Challenge_prizes: the award to the winner(s) of the challenge. In the exemplary embodiment, at least one entry may also be added to a Challenge_metrics table with ID: 98734567; Metrics Name: Running Distance; Challenge_id: 478923; Goal: miles run; Target_minimum: 100 miles. In some embodiments, multiple metrics may be added. In the exemplary embodiment, metrics include ID: 98734568; Metrics Name: Average Running Speed; Challenge_id: 478923; Goal: 10 mph; Target_minimum: 6 mph.

In some embodiments, the tracking system may update challenge objects based on determinations of whether athletes have advanced along progression metrics of the challenge objects. In the exemplary embodiment, a distance running challenge is constrained by a minimum and target average running speed. The challenge may be configured to only award an enrolled athlete participant if the athlete's total average running speed exceeds the minimum threshold. In some embodiments, a challenge may be configured to disallow particular metrics updates when a running speed does not exceed the minimum threshold. In some embodiments, a challenge may be configured to allow a single entry below the minimum threshold, for example, a single entry below the minimum running speed, but then reject further entries that do not meet the minimum threshold. The tracking system may in other embodiments enforce different combinations of the above criteria or related criteria.

The tracking system may notify an administrator when challenges are proposed. For example, after submitting the challenge, a notification, such as an e-mail or pop-up notification, may alert an administrator, which may be an administrator user assigned to a specific brand, that a new challenge has been proposed by the brand and is awaiting approval. A challenge waiting for approval may be considered to be in a pending state. In some embodiments, challenges recorded in a relational database may also include a state field configured to tracks the state of the challenge through its phases, for example: pending, active, rejected, completed, among other states.

An administrator may access, and user of other user roles may be virtually gated from accessing, a challenge approval GUI. One exemplary challenge approval GUI is discussed with respect to FIG. 6. A challenge approval GUI may show each challenges currently in a pending state.

Figure 6:
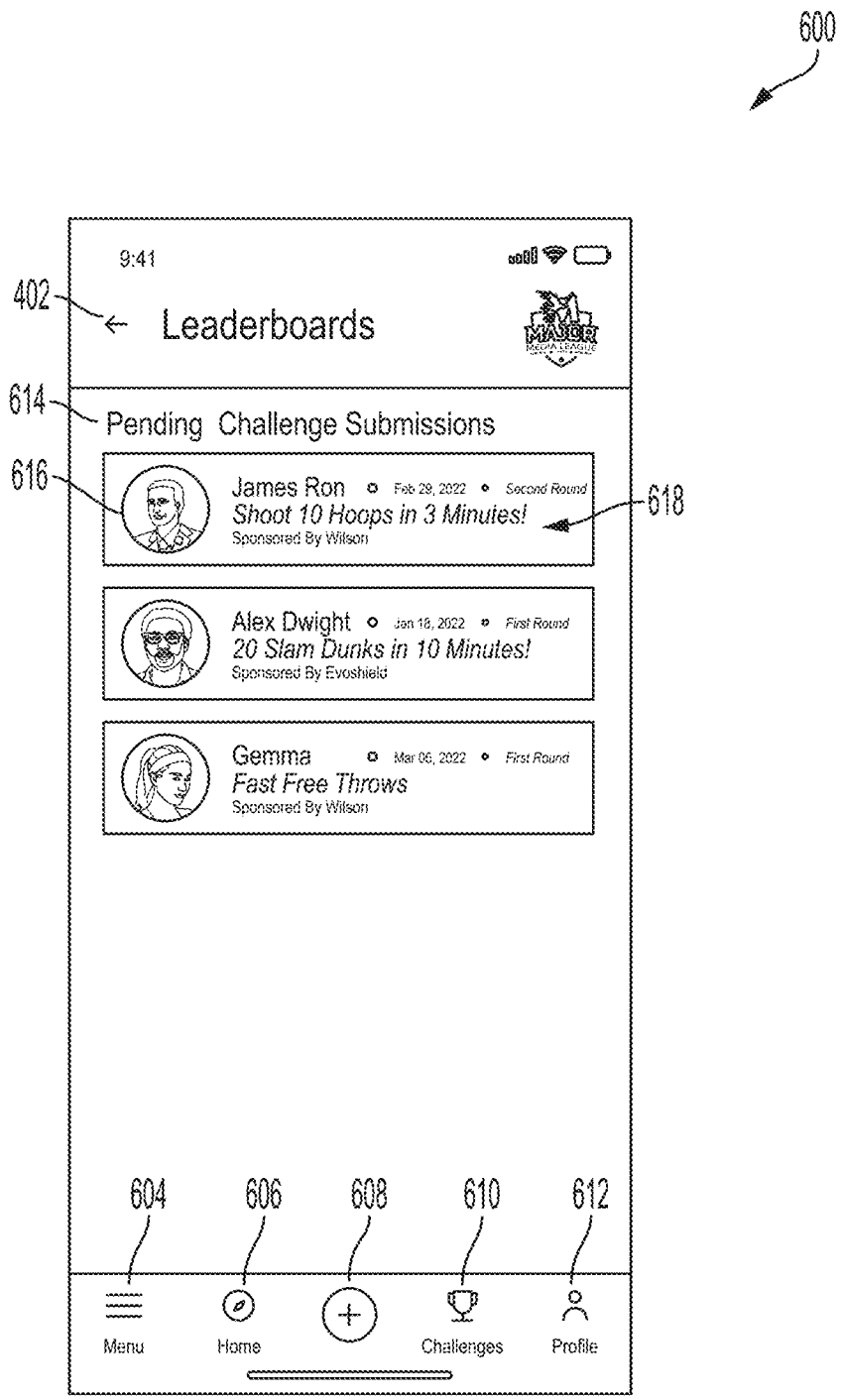
FIG. 6 shows an additional exemplary embodiment of a GUI.

FIG. 6 shows an exemplary embodiment of a GUI 600, which may be a tracking object authorization GUI displayed using a computer system such as exemplary computer system 300. GUI 600 includes a GUI element 402, a GUI element 604, a GUI element 606, a GUI element 608, a GUI element 610, a GUI element 612, a GUI element 614, a GUI element 616, and a GUI element 618.

Collectively comprising an administrator navigation element, GUI element 604 may be configured to open a side menu, GUI element 606 may be configured to open an administrator home, GUI element 608 may be configured to open an administrator create GUI, GUI element 610 may be configured to open a challenges categories GUI, and GUI element 612 may be configured to open a brand ambassador profile GUI. GUI element 614 may be configured to display a forum of pending challenge submissions. In some embodiments, GUI element 616 may be configured to, for a respective challenge, display information for the challenges such as a team logo, and may be configured open a brand ambassador profile GUI. GUI element 618 may be configured to open a challenge information GUI.

In some embodiments, the tracking system may present a GUI to administrator for approving proposed challenge objects. For example, the GUI may enable selection of an individual challenge to approve, opening another GUI configured to enable approval or rejection of the specific challenge, such as in FIG. 7 discussed below.

Figure 7:
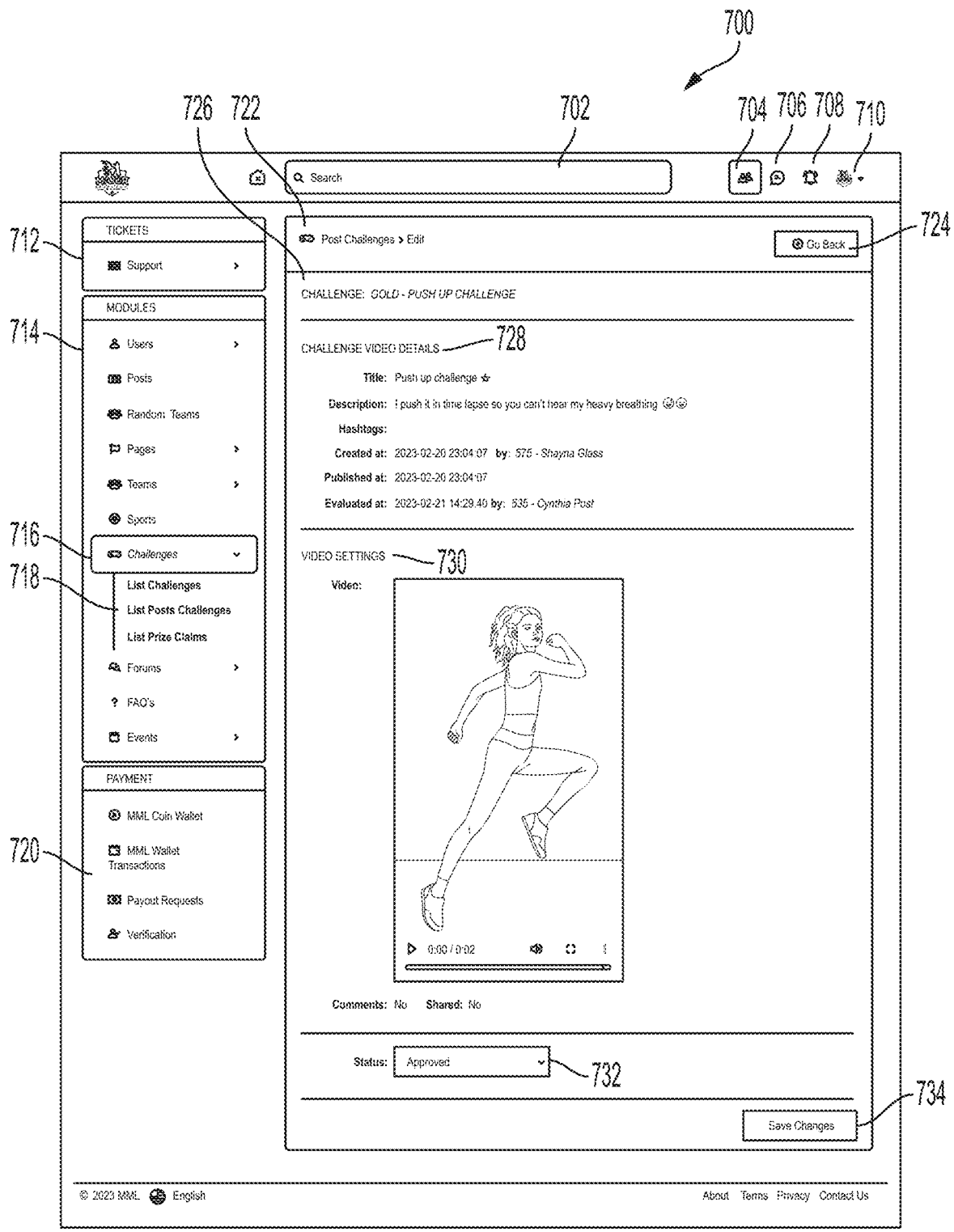
FIG. 7 shows an additional exemplary embodiment of a GUI.

FIG. 7 shows an exemplary embodiment of a GUI 700, which may be a tracking object authorization GUI displayed using a computer system such as exemplary computer system 300. GUI 700 includes a GUI element 702, a GUI element 704, a GUI element 706, a GUI element 708, a GUI element 710, a GUI element 712, a GUI element 714, a GUI element 716, a GUI element 718, a GUI element 720, a GUI element 722, a GUI element 724, a GUI element 726, a GUI element 728, a GUI element 730, and a GUI element 732.

In some embodiments, GUI element 702 may comprise a search element. GUI element 704 may be configured to open an administrator profile. GUI element 706 may be configured to open a messaging element. GUI element 708 may be configured to open a notification element. In some embodiments, GUI element 710 may be configured to open a menu element. GUI element 712 may be configured to open a support tickets GUI. In some embodiments, GUI element 714 may be a modules element which may include users, posts, random teams, pages, teams, sports, a GUI element 716 for challenges, forums, FAQs, and events. GUI element 716 may further comprise elements to list challenges, GUI element 718 to list posts challenges, and to list prize claims. GUI element 720 may be a payments element including MML coin wallet, MML wallet transactions, payout requests, and verification. GUI element 722 may be a post challenges GUI with GUI element 724 configured to go back, GUI element 726 presenting a challenge title, GUI element 728 displaying challenge video details, GUI element 730 presenting video settings, and GUI element 732 presenting a status such as pending, approved, or denied. GUI element 728 may display challenge video details including a description, tags, creation, publishing, and evaluation dates with respective user identifications.

The tracking system may prompt an administrator to review and approve or reject proposed challenge objects. When an administrator approves a challenge, an approval GUI element may be selected a challenges database record may then be updated to set the Active field to true. The tracking system may then review the End Date field of the challenge object and may automatically update the End Date. For example, if there was a sufficient delay between submission and the approval, the tracking system may update the End Date to be one month, or another time, from approval.

When an administrator rejects a proposed challenge, the tracking system may prompt the administrator to enter a rejection reason in a text or other box. Entering a rejection reason may trigger a notification to be sent to a brand user who submitted the challenge, stating that the challenge has been rejected, with the reason included in the message. For example, the administrator may reject a challenge because it is a repeat of an existing challenge, because a goal or minimum target are too low or too high, because an award is too low or too high, or for other reasons.

Approved challenges may be listed in a forum or index accessible to users having a role of athlete. If a challenge object is approved, and it has the Active Boolean set to true, the challenge may then be accessible in a challenge forum or index to athletes, coaches, and fans, as well as to a brand that submitted it. For example, an athlete, coach, or fan may search for the challenge in a GUI such as in FIG. 8.

In various embodiments, the tracking system may provide users having an athlete user role with filters for narrowing challenges in which to enroll. For example, a GUI may allow an athlete may enter a search term such as running or distance running in a search box. Using standard keyword search means, the tracking system may search a challenged index of forum for Active Challenges with a Title or other field matching the search term. In some embodiments, the tracking system may search a Challenge_Metrics table for metrics whose Title or other field matches the search term, and which also joins to a Challenge that is Active. The tracking system may then present to the athlete an index of matching Challenges, for example, from a set of database records returned from the search.

Figure 8:
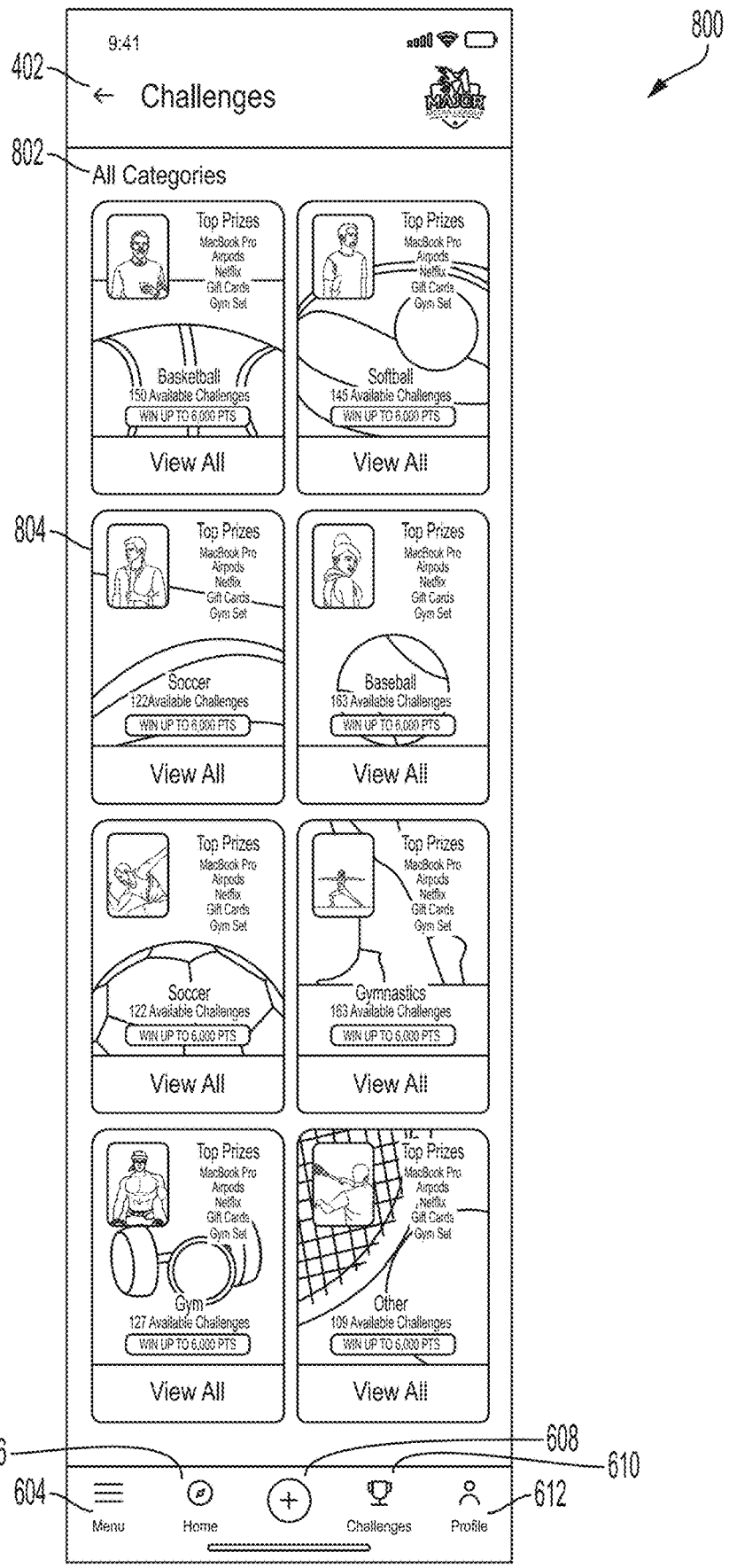
FIG. 8 shows an additional exemplary embodiment of a GUI.

FIG. 8 shows an exemplary embodiment of a GUI 800, which may be a tracking object enrollment GUI displayed using a computer system such as exemplary computer system 300. GUI 800 includes a GUI element 402, a GUI element 604, a GUI element 606, a GUI element 608, a GUI element 610, a GUI element 612, a GUI element 802, and a GUI element 804.

In some embodiments, GUI element 802 is configured to present a forum listing challenges in which users may enroll. GUI element 804 may be configured to present categories of a challenges and may be configured to open a listing of challenges of a particular category.

The tracking system may provide athletes with a selectable GUI element for enrolling in a challenge. For example, an athlete may select one of a plurality of challenges providing in a forum or index that is presented to users having an athlete user role. In some embodiments the challenge forum or index may be virtually gated from users not having an athlete user role.

Figure 9:
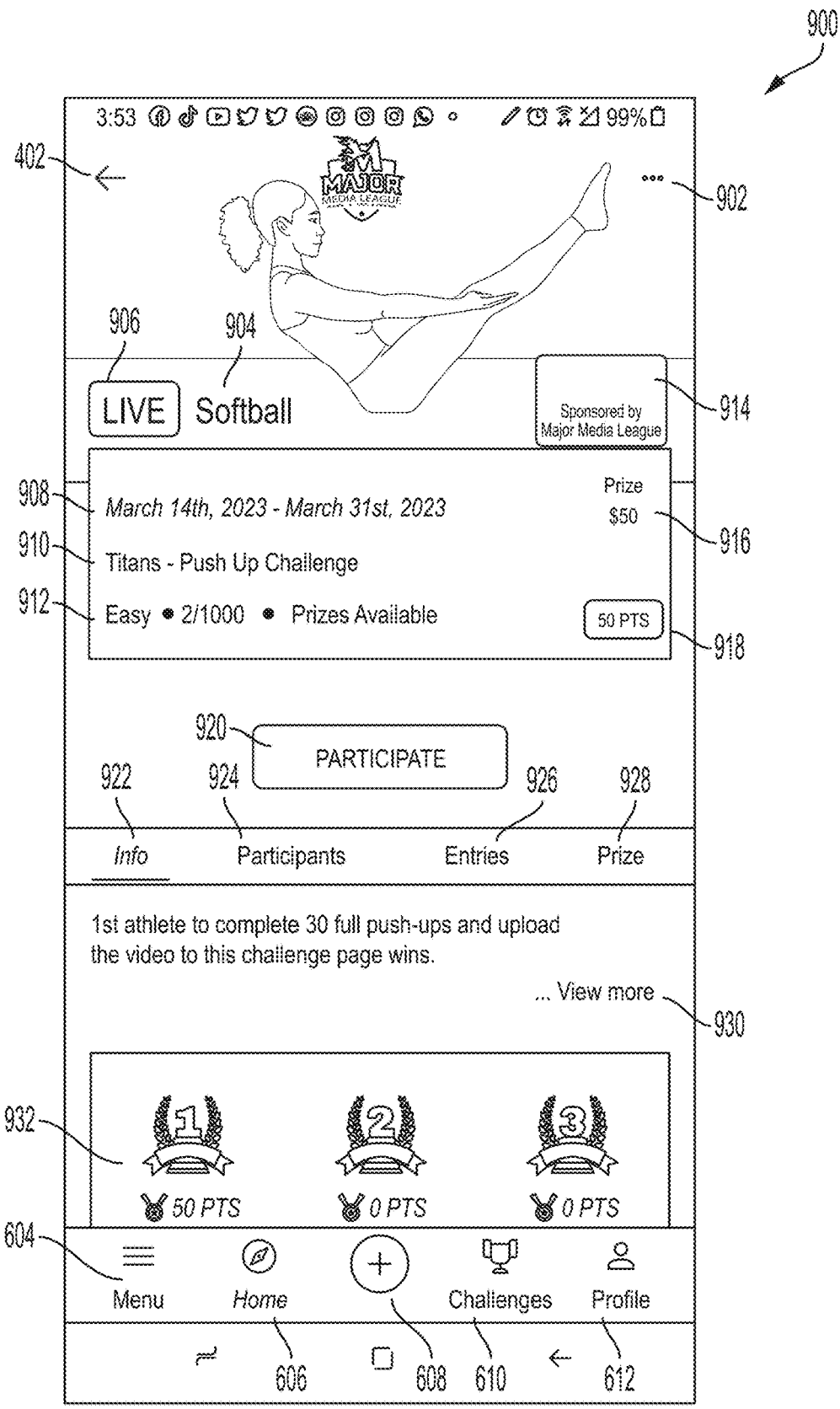
FIG. 9 shows an additional exemplary embodiment of a GUI.

An exemplary GUI for enabling participation in challenges is discussed with respect to FIG. 9. FIG. 9 shows an exemplary embodiment of a GUI 900, which may be a tracking object progression metrics GUI displayed using a computer system such as exemplary computer system 300. GUI 900 includes a GUI element 402, a GUI element 604, a GUI element 606, a GUI element 608, a GUI element 610, a GUI element 612, a GUI element 902, a GUI element 904, a GUI element 906, a GUI element 908, a GUI element 910, a GUI element 912, a GUI element 914, a GUI element 916, a GUI element 918, a GUI element 920, a GUI element 922, a GUI element 924, a GUI element 926, a GUI element 930, and a GUI element 932.

In some embodiments, GUI element 902 may be configured to present an additional menu. GUI element 904 may be configured to present a challenge category and GUI element 906 may indicate a live status of a challenge. Elements may present challenge information, for example, GUI element 908 may present timing information of a challenge, GUI element 910 may present a challenge title, GUI element 912 may present difficulty and/or prize information, GUI element 914 may presenting a sponsor, GUI element 916 may present a prize amount, and GUI element 918 may present a point amount. GUI element 920 may be configured to enroll a user in the challenge. Further elements may present challenge information, such as GUI element 922 presenting a challenge description, GUI element 924 presenting an enrolled user participant list, GUI element 926 presenting entries, GUI element 930 presenting prize information, and GUI element 932 presenting winner information, including placings and points associated with the placings.

The tracking system may be configured to enroll users having an athlete user role with challenge objects. When an athlete elects to enroll with a challenge, for example, by selecting a participate selectable GUI element of a GUI, the tracking system may add a database record to a Challenge_standings table, comprising the Challenge_id and the Athlete_id. There may be NULL values for Athlete_score and Athlete_rank fields in the record. In some embodiments, the presence of the record indicates that an athlete has enrolled with a Challenge. In some embodiments, the tracking system may notify any challenge sponsors, such as an administrator, brand, coach, or fan, that the athlete has enrolled. Responsive to the notification, the tracking system may prompt the sponsor to send a welcome message to the athlete. A welcome message may include information detailing the rules of the challenge, the means by which an athlete should submit updated progression metrics to the challenge, details on the challenge prizes, and other information. The tracking system may also generate a welcome message automatically, and without sponsor interaction with the system.

In some embodiments, a progression metric may be submission of a video upload by an athlete. In such embodiments, challenges may be conducted using video uploads by athletes that are participating in the challenge. The tracking system may provide video-recording GUIs to athletes and video viewing GUIs to users of various user roles.

Figure 10A:
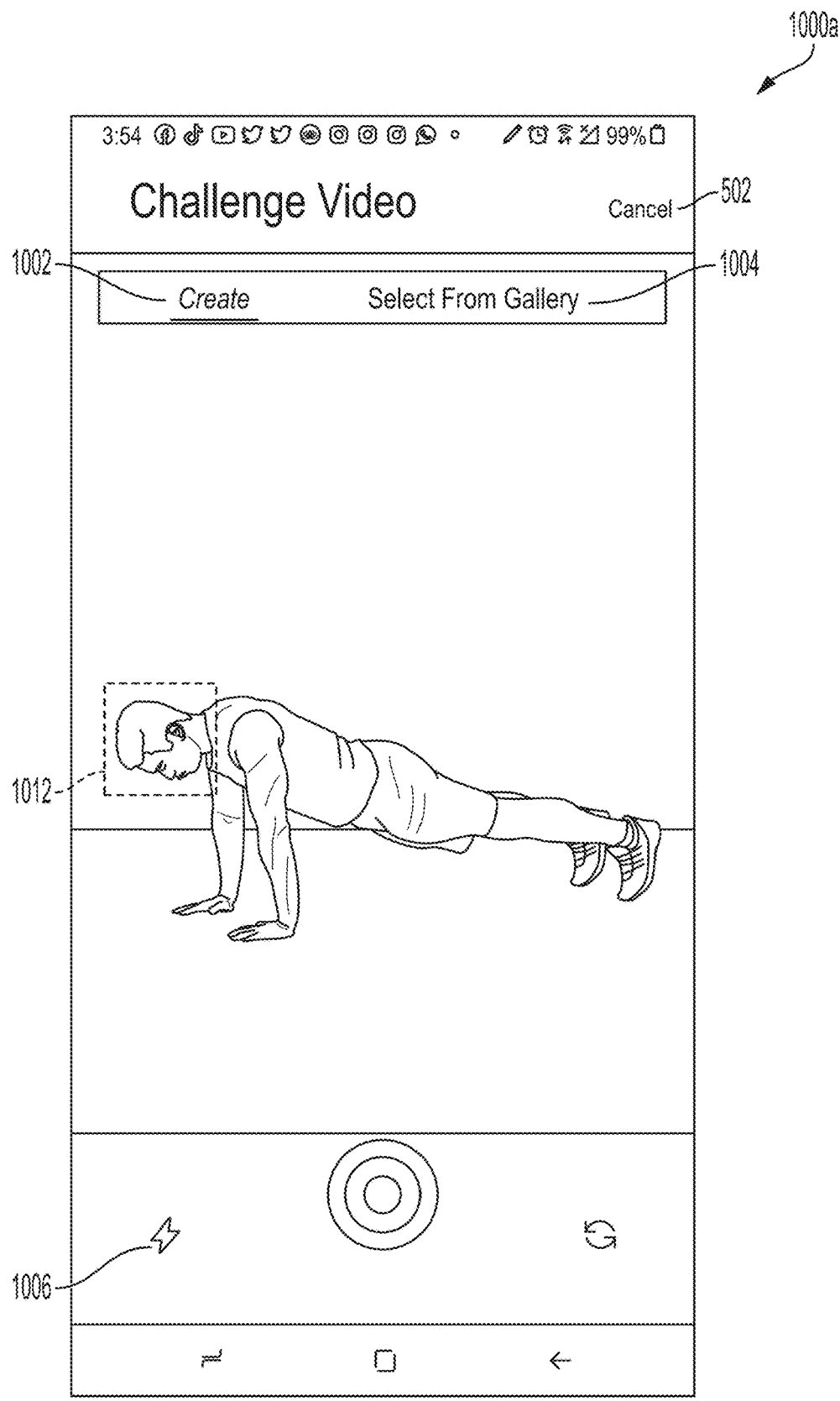
FIGS. 10A-10B shows additional exemplary embodiments of GUI.
Figure 10B:
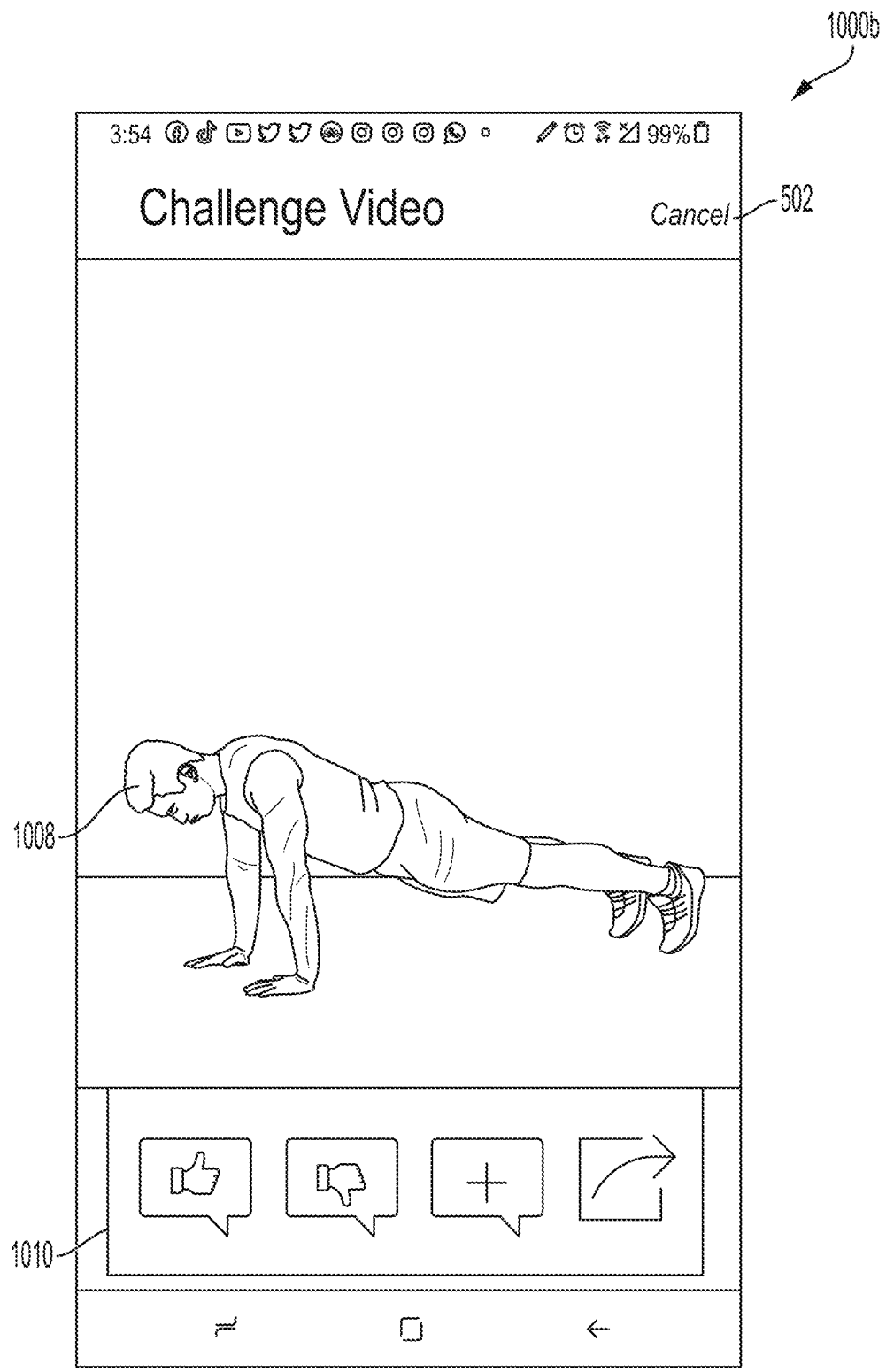

FIG. 10A shows an exemplary embodiment of a GUI 1000A, which may be a tracking object video creation GUI, and FIG. 10B shows an exemplary embodiment of a GUI 1000B, which may be a tracking object video display GUI, each which may be displayed using a computer system such as exemplary computer system 300. GUI 1000A includes a GUI element 502, a GUI element 1002, a GUI element 1004, a GUI element 1006, and a GUI element 1012. GUI 1000B includes a GUI element 502, a GUI element 1008, and a GUI element 1010.

In some embodiments, GUI element 1002 may be configured to trigger creation of a challenge video while GUI element 1004 may be configured to select an existing challenge video. GUI element 1006 may present video creation controls. In the illustrated embodiment of FIG. 10A, an athlete is shown attempting to complete progression metrics for a tracking that specifies a particular number of pushups to be completed by the athletes. This should be understood to be merely one exemplary embodiment of a challenge that may be recorded on video, as numerous examples are discussed throughout the disclosure. GUI element 1008 may present a challenge video to a user (here, the recorded video of the athlete performing pushups), while GUI element 1010 may be configured to allow a user to socially engage with a challenge video, for example, using vote up/down, comment, and sharing elements.

The tracking system may determine whether a user has met a progression metric based on a video or other recording. The tracking system may provide athletes with screen and video recording technology, enabling athletes to create videos of themselves performing any activity or progression metrics requested by a challenge. When an athlete is completed with recording, the tracking system may prompt an athlete to upload the video.

In determining whether athletes have advanced along progression metrics for challenges, the tracking system may validate videos. For example, GUI element 1012 may be a validation GUI element. The tracking system may automatically validate videos to ensure that submitted videos are genuine and that the activity depicted in the video are being performed by the athlete. In the illustrative embodiment of FIG. 10A, the tracking system may perform facial recognition of the athlete to validate the video (as described above), and the GUI element 1012 provides the user with a visual indication of the facial recognition. In the exemplary embodiment, the system may use the video to count a number pushups performed by the athlete, using the facial recognition or other recognition of the athlete in the video. In some embodiments, the video recording GUI may be configured to perform continuous recording. In alternative or additional embodiments, the tracking system may implement facial recognition or machine learning algorithms to ensure that a person depicted in the video is a user associated with the athlete profile. To facilitate implement facial recognition or machine learning algorithms, during a user enrollment process, the tracking system may require the user to submit photo IDs, require the user to take video or pictures of their face, or provide other inputs that may be later used for video authentication.

In some embodiments, administrators may validate athlete videos. For example, to further ensure validity, after an athlete submits a video entry to a challenge, the video may be provided in a GUI to an administrator, prompting the administrator to approve the video before the video is listed on a challenge entry section of a challenge page and/or on an athlete profile and/or feed. In some embodiments, an administrator may be prompted at a back end to access an athlete's challenge post in a list section and may be prompted to confirm or reject the video entry.

In some embodiments, a challenge may be conducted by the tracking system in real-time. For example, a basketball scoring challenge may be scheduled for a particular start time, and enrolled athletes are prompted to begin the challenges, for example, shooting baskets from the 3-point line, at that time. For example, a first athlete to score 10 baskets might be the winner of the challenge. In the exemplary embodiment, athletes may be prompted to stream video from a GUI of the tracking system and a sponsor, such as an administrator, coach or brand is provided with a GUI of the streams of all participants. The tracking system may validate a winner of challenge would be performed by directly observing the video streams. In some embodiments, other users, such as fans may observe real-time challenges using the tracking system.

Figure 11:
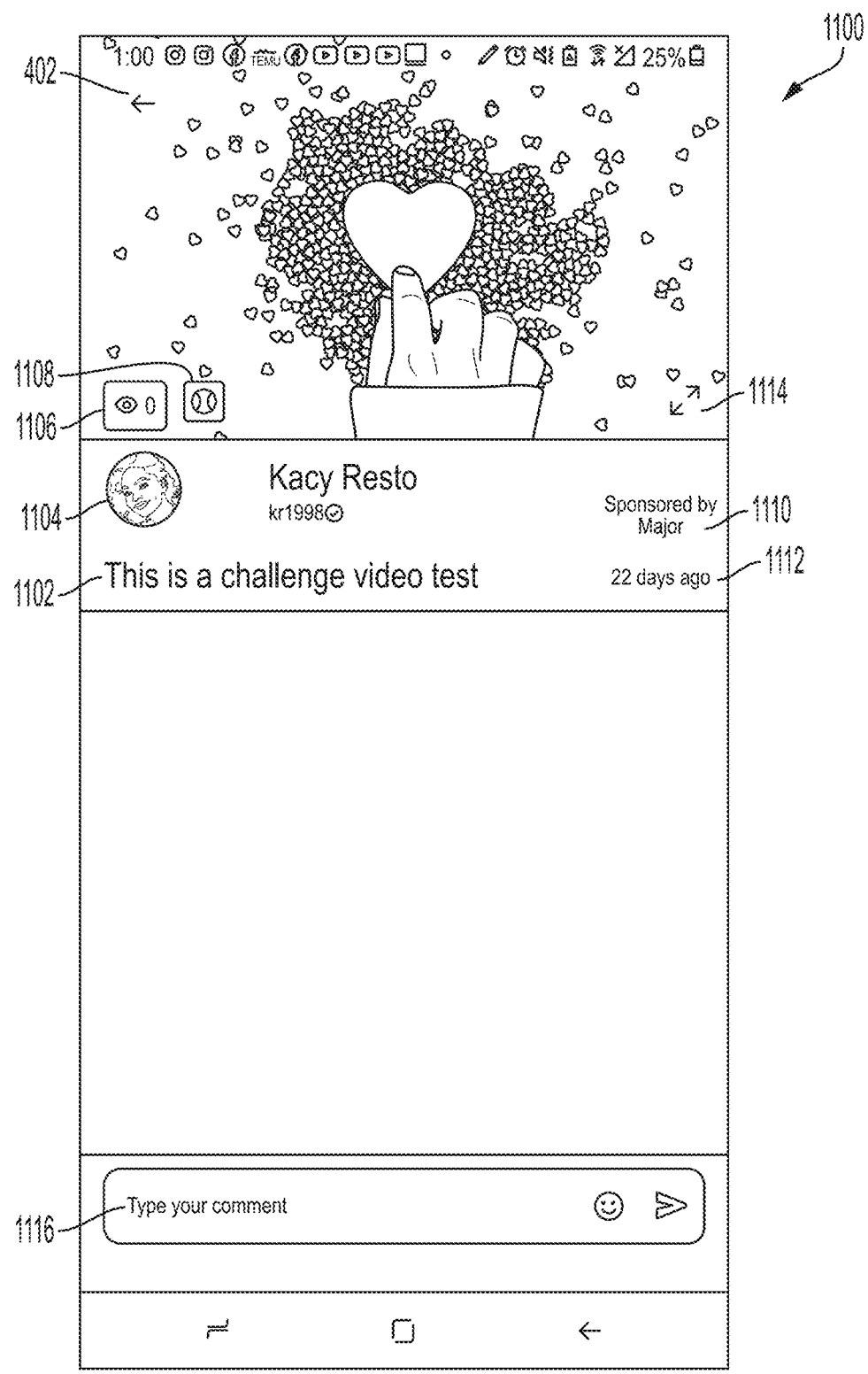
FIG. 11 shows an additional exemplary embodiment of a GUI.

In various embodiments, as illustrated in FIG. 10B, challenge videos, either recorded/uploaded or real-time, may be presented to other users, such as fans, coaches, or other athletes for viewing, commenting, voting, linking, and other related social engagement activities:

FIG. 11 shows an exemplary embodiment of a GUI 1100, which may be a tracking object video selection GUI displayed using a computer system such as exemplary computer system 300. GUI 1100 includes a GUI element 402, a GUI element 1102, a GUI element 1104, a GUI element 1106, a GUI element 1108, a GUI element 1110, a GUI element 1112, and a GUI element 1114.

In some embodiments, GUI element 1102 may be configured to present a challenge video title. GUI element 1104 may present a user image which may open a user profile. GUI element 1106 may present a view count and GUI element 1108 may present a challenge category such as a particular sport. GUI element 1110 may present a challenge sponsor. GUI element 1112 may present a video posting time. GUI element 1114 may open additional information for a challenge video.

In some embodiments, tracking objects such as challenge objects may include progression metrics. For example, challenges may have stages that represent certain accomplishments that the tracking system requests athletes complete within a given timeframe. In some embodiments, a challenge may have a single stage with a single EndDate. In some embodiment, a challenge may have several stages, each having respective EndDates, which may for example be successive EndDates. It should be appreciated that single or multi-stage challenges may be implemented with reference to rows added to a Challenges table. For example, a multi-stage challenge may include two or more rows in the table, each with different names, for example, Free throw shooting stage 1, Free throw shooting stage 2, etc. In some embodiments, each stage may have separate requirements indicated by a challenge description. In some embodiments, challenge metrics for each stage prompt athletes to meet the requirements of the given stage.

In some embodiments, the tracking system prompts athletes to input metric values. For example, as a challenge progresses, enrolled athletes may be prompted to submit updated metrics values to the tracking. For example, an athlete in a distance running challenge may periodically submit distances that have been run. In certain embodiments, the metric values may be verified by the tracking system.

In various embodiments, athletes may input metrics using a GUI. For example, submissions may be by submission of the metrics values from a GUI screen. For example, the screen may be configured to list each Challenge_metric relevant to the challenge, such as after first selecting the particular challenge to be updated and having an entry box next to each listed metric. Upon submission of this form, the tracking system may perform automatic validation. For example, each metric may be checked against a range of valid values, such range values may be added to the database schema for the Challenge_metrics records. In addition, or alternatively, athlete entry may require validation by a coach, such as their coach. In this case, the athlete entry may be presented on a GUI to the coach, for example, a GUI comprising an index of all athlete Challenge_metrics entries that need validation, and the coach is prompted to select an approve GUI element on each metric for it to be accepted.

In other embodiments, the tracking system may limit input of metric values to values collected by biometric user equipment. In some embodiments, users may be limited to inputting metrics collected by fitness equipment such as fitness watches, which may record metrics such as distance, speed, steps, heartrate, and other metrics. For example, alternative means of validating metrics may be provided. In some embodiments, the tracking system may limit input of metrics to direct entry of metrics via automated technology, such as GPS tracking devices, for example, those provided by Under Armor's Map My Run application. In some embodiments, the tracking system may perform an integration method to integrate metrics from an external application, such as by allowing the athlete to enter their user credentials for the external application and then using those credentials to make an API request, such as a REST API request, to the external application to receive any relevant Challenge_metrics data. The tracking system may be configured to support storing the external application credentials in the database to support this workflow.

In some embodiments, the tracking system may validate progression metrics using images or videos. For example, the tracking system may be configured to accept still image or video data that support validation of Challenge_metrics entries provided by athletes. In some embodiments, an athlete may be prompted, for example, after entering a Challenge_metrics data in an entry form, to additionally upload an image or video that validates the entry. For example, the athlete may create a video of a run they have performed with various supporting evidence, such as images providing information about times and locations. As another example, an athlete in a fastball speed challenge may upload a video showing the athlete performing the pitch on a baseball field, with a radar gun in the foreground. The tracking system may provide an interface for creating, editing, and uploading video evidence of athlete skills. In such embodiments, the tracking system may use automated methods, such as image processing, or manual methods, such as an Administrator viewing and accepting video evidence, to validate a combination of an athlete's submitted evidence of a progression metric.

The tracking system may update tracking objects based on metrics submitted by athletes. For example, after a metric has been submitted, the tracking system may add a record to the Athlete_challenge_metrics table corresponding to the respective challenge and athlete and may include the current date/time. When a metric has been validated, the tracking system may set the validated Boolean to true, and this metric entry may then be considered in a ranking algorithm for the challenge. In addition, by tracking the date/time of each metrics entry, the tracking system may be configured to provide analytics, such as time-axis graphing, which can provide athletes and their coaches with monitoring of progress. In some embodiments, date-time tracking enables reconstructing an overall state, for example, for rankings, of a challenge at any given time so as to present an analysis of how Challenge_standings change over time.

The tracking system may allocate prizes to athletes based on progression metrics. In some embodiments, all athletes that meet minimum criteria for a challenge metric or metrics are qualified to win the prizes associated with the challenge. In some embodiments, athletes are ranked according to an algorithm that measures engagement with the athletes as they participate in the challenge. For example, the tracking system may track engagement may be tracked using a challenge video viewing GUI such as in FIG. 10B. For example, a ranking algorithm may weight likes, shares, comments, views, hearts, and incoming traffic links, from external social apps such as Facebook, Instagram, Twitter, or other traffic sources, on a video viewing GUI. The tracking system may track engagement statistics in the Athlete_challenges_engagment_metrics table. In this way, it is appreciated that qualified athletes may be provided, through the tracking system, with support for their efforts. Furthermore, coaches, brands, and fans may observe the influence of a given athlete in promoting the sponsor of the challenge, such as a brand.

In some embodiments, an algorithm for computing the rankings in a challenge may be based on engagement metrics. For example, a mathematical formula may combine likes, upvotes, downvotes. In a preferred embodiment, a challenge ranking score may be computed as: Number_of_likes+((Upvotes−Downvotes)/3). In some embodiments example, the counts of engagement metrics may be computed for only the latest video from the athlete, or from an aggregation of counts (e.g. a sum or average) from a set of videos for an athlete, for example, all videos from the athlete.

In some embodiments, the score for computing rankings may be derived from various progression metrics. For example, an athlete's score may be computed from the average of their progression metrics values (e.g., for a particular set of videos, or all videos for that athlete), or from their latest progression metrics value or from their best progression metrics value. In some embodiments there may be multiple scores and associated rankings, for example, one set of scores and rankings based on engagement metrics and one set of score and rankings based on challenge progression metrics. The system may provide GUIs for viewing the scores and ranking for a challenge, which may include a toggle (e.g., a checkbox or menu pull-down) to view the scores and rankings according to one mode or another.

The tracking system may provide a score for each athlete enrolled in each challenge. The tracking system may compute a score for all athletes participating in a challenge, and compute a sorted ranking of athletes, then store the ranking in the Challenge_standings table. This table may be used as a persistent storage for a leaderboard for a respective challenge. In some embodiments, the tracking system may be configured to break ties in the rankings according to which athlete entered the challenge first, for example, as indicated by a Date in the Challenge_videos table corresponding to the athlete's video entry.

The tracking system may recompute rankings periodically. For example, the computation of the algorithm may be triggered by a scheduled process, such as a cron process, that periodically updates rankings for all active challenges, or may be invoked whenever a new engagement related action is receive by the application, for example, at a same time the Athlete_challenge_engagement_metrics entry is updated. As a result, all athletes in a challenge, or all challenges, will receive updated rankings for that challenge.

In some embodiments, the tracking system uses natural-language-processing algorithms to supplement the ranking algorithm. For example, user comments may be processed by sentiment analysis technology, to determine the degree of enthusiasm for a given athlete. The output of a sentiment analysis algorithm may be based on a single comment to modify the engagement contribution of the particular comment or may be aggregated across many comments for a given athlete as a separate input to the ranking algorithm.

Figure 12:
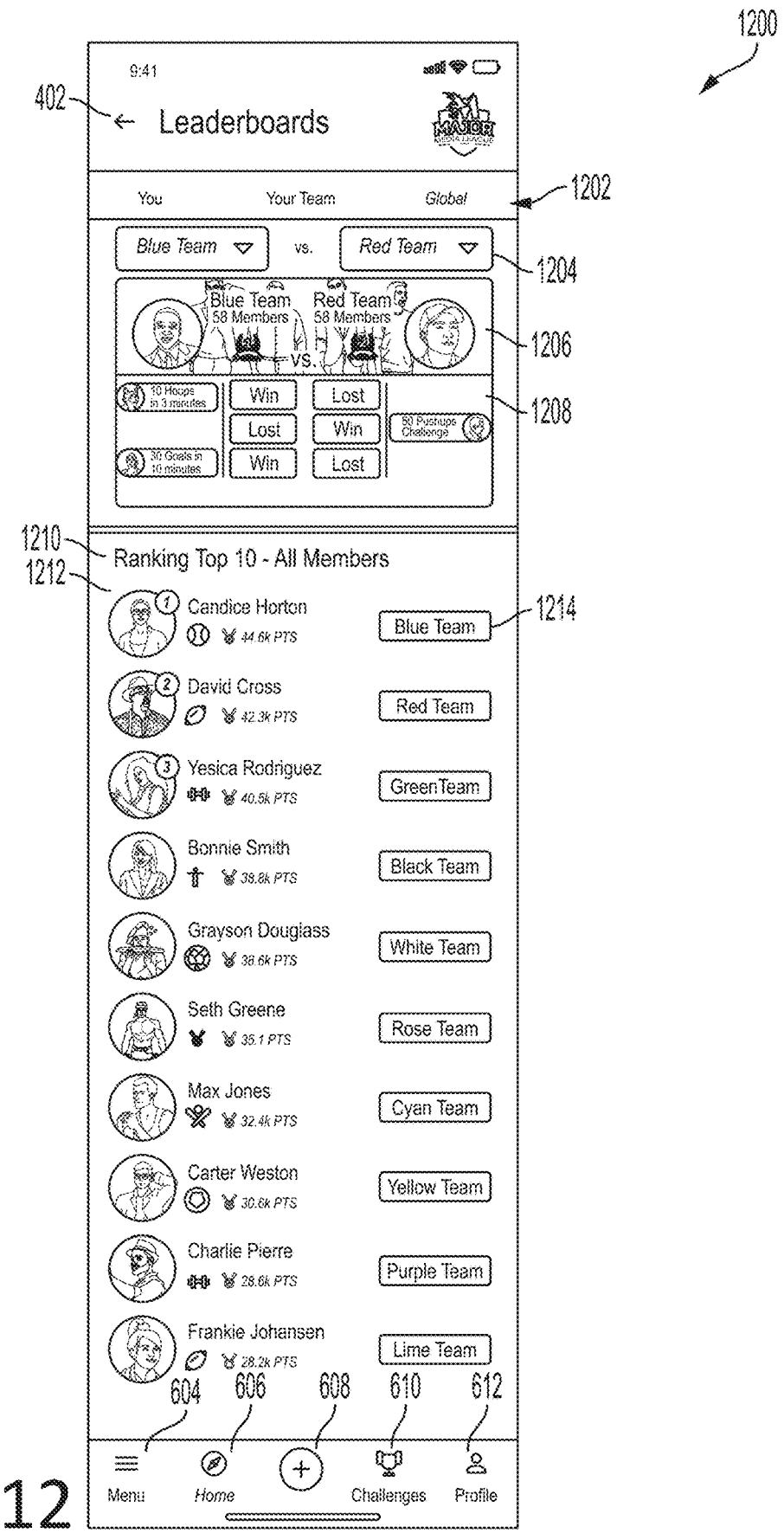
FIG. 12 shows an additional exemplary embodiment of a GUI.

The system may provide GUIs for viewing challenge rankings. For example, FIG. 12 shows one exemplary embodiment of a GUI that may be viewed by users. In some embodiments, a ranking GUI may be viewed by all users at any times. In other embodiments, the system may restrict access to the ranking GUIs to particular users based on user roles or other authorizations described herein. FIG. 12 shows an exemplary embodiment of a GUI 1200, which may be a tracking object progression metrics GUI displayed using a computer system such as exemplary computer system 300. GUI 1200 includes a GUI element 402, a GUI element 604, a GUI element 606, a GUI element 608, a GUI element 610, a GUI element 612, a GUI element 1202, a GUI element 1204, a GUI element 1206, a GUI element 1208, a GUI element 1210, a GUI element 1212, and a GUI element 1214.

In some embodiments, GUI element 1202 may present a scrolling selector menu including filters by user, team, global, or other elections. GUI element 1204 may provide a drop-down element for comparing teams. GUI element 1206 may be configured to present team logos which may open team GUIs. GUI element 1208 may present an interactive win and loss chart for teams. GUI element 1210 may list a ranking of users and may include GUI element 1212 configured to open brand ambassador profiles and GUI element 1214 configured to open team GUIs.

The tracking system may provide, to users having a brand user role, a ranking of athletes for a brand challenge. For example, a brand user may select a challenge the brand has sponsored, for example, from an index screen of active challenges, and the tracking system may present a GUI having a sorted list of athletes involved in the challenge, for example sorted by decreasing score, or increasing rank. From the ranking GUI, a brand or other user may be displayed with which athletes participating in the challenge are receiving high engagement. The ranking may provide a recommendation to brands which athletes may be good candidates for formal sponsorship arrangements, or for coaches, coaching arrangements. The ranking GUI may further provide links to the athletes' individual pages, and athlete pages may provide direct messaging or other communication methods between an interested user and the athlete. In some embodiments, fans may access these athlete profile GUIs to communicate with the athletes.

In some embodiments, the tracking system may integrate external communication with one or more GUIs of the tracking system. For example, the tracking system may provide fans or other users with selectable GUI elements for sending links to challenges to other social media platforms, such as Facebook or TikTok. To facilitate engagement using external communication, the tracking system may present certain GUIs, such as GUIs displaying challenge rankings, or GUIs presenting videos of athletes participating in challenges, to be accessible without user authentication. In some embodiments, these unauthenticated GUIs may provide additional security and privacy methods, such as deidentification of athletes' private information and removal of geolocation information from videos. In some embodiments, the tracking system may post URLs to external sites that include tracking information, for example, using extra URL parameters, to specifically indicate that these links are being accessed from the external location, by external users. Externally viewable GUIs may include links to encourage other individuals to register for the tracking system. When incoming links are accessed, the tracking system may record additional information and provide it to the ranking algorithm. For example, the tracking system may record external track backs and may weight these impressions differently, such as less, than the tracking system weights engagement from registered users.

The tracking system may also promote certain athletes and their participation in challenges based on the ranking algorithm. For example, if a particular challenge video receives a high ranking score, a link to this video may be displayed prominently in various GUIs throughout the tracking system. For example, the link may be added to a main GUIs for a user, such as the GUI presented. once the user has logged in, based on the user's FavoriteSports preferences, or based on other information in the user profile, for example, using keyword searching or related natural language processing techniques applied to the user's Description field. In some embodiments, the tracking system may be configured to display high-ranking challenge videos to all users, independent of stated user preferences.

A challenge may continue until an end date associated with the respective challenge. The tracking system may use the progression dates of each challenge to present a calendar view of upcoming, ongoing, and recently completed challenges. The calendar view may present a convenient arrangement to display to challenge participants and observers and may include links to individual challenges.

Figure 13:
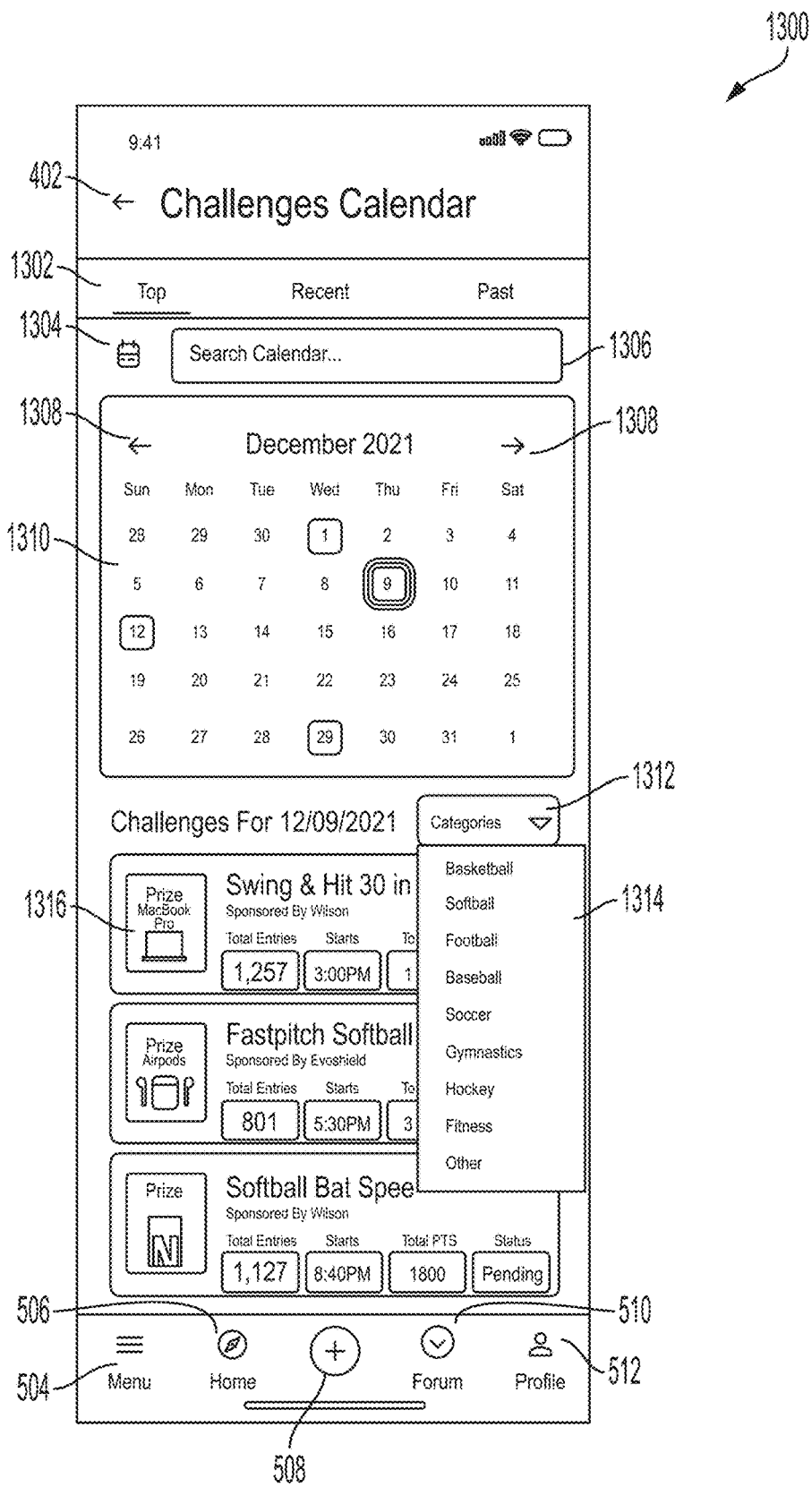
FIG. 13 shows an additional exemplary embodiment of a GUI.

FIG. 13 shows an exemplary embodiment of a GUI 1300, which may be a tracking object listing GUI displayed using a computer system such as exemplary computer system 300. GUI 1300 includes a GUI element 402, a GUI element 504, a GUI element 506, a GUI element 508, a GUI element 510, a GUI element 512, a GUI element 1302, a GUI element 1304, a GUI element 1306, a GUI element 1308, a GUI element 1310, a GUI element 1312, a GUI element 1314, and a GUI element 1316.

In some embodiments, GUI element 1302 may be a scrolling selector menu with filters such as top, recent, or past. GUI element 1304 may be configured to present a calendar pop-up date range selection element. GUI element 1306 may present a search bar configured to allow users to search for challenges in a calendar. GUI element 1308 may provide toggles for scrolling through months. GUI element 1310 may present a calendar, where selecting dates presents challenges for that date. GUI element 1312 may provide selector drop-down for categories, where GUI element 1314 provides drop-down menu items for categories. In some embodiments, GUI element 1316 may present challenges meeting selections made by a user.

In some embodiments, the tracking system periodically checks, for example, using a cron process, to deactivate challenges with an End Date that has been reached. After an End Date has been reached, a challenge's Active field may be set to false, and/or the state of the challenge may be set to completed. At completion, the tracking system may provide challenge prizes to an athlete or athletes that have achieved a highest ranking, or range of highest rankings. Prizes may be those specified at the origination of the challenge and may be managed by the tracking system and administrators in various ways.

In some embodiments, the tracking system may maintain a proprietary digital currency, for example implemented using blockchain technology. Sponsors may purchase tokens of the currency in varying amounts and may transfer the tokens to challenge-winning athletes using digital currency technology. The tracking system may record transfers of currency and maintain a copy of a ledger to track all prizes received by an athlete. Digital currency accounts such as wallets may be used throughout the tracking system to provide payments. For example, fans may establish digital currency accounts and use tokens to support athletes. In some embodiments, athletes may use digital currency to purchase equipment from brands, and the tracking system may trigger shipping of the physical goods to the athletes. The tracking application may provide a digital currency wallet by storing an encrypted version of a key or keys needed to interact with an external blockchain-driven currency system, such as Ethereum. Digital currency systems may enable full tracking of a user's holdings and transactions, and the tracking system may provide the currency tracking information to users, for example, statements or transaction summary GUIs, for example, by making dynamic API calls to digital currency platforms, thereby isolating the digital currency data from the tracking system.

The tracking system may manage other types of prizes. For example, cash awards may be transmitted from a sponsor to the athlete(s) using electronic means, such as PayPal or Venmo. In some embodiments, digital gift cards may be credited to an athlete, and/or physical awards, such as equipment, may be shipped to athletes' addresses.

Figure 14:
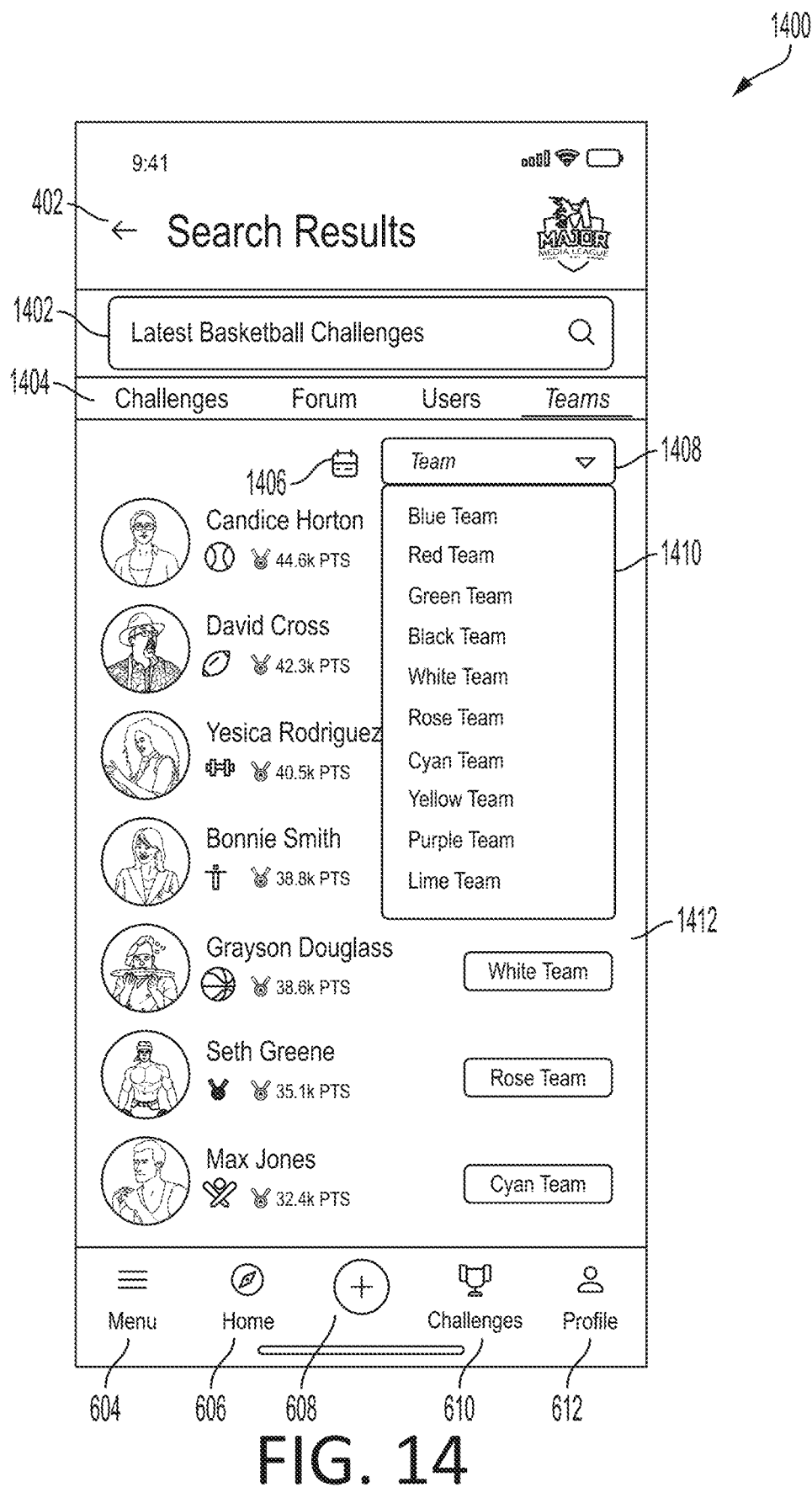
FIG. 14 shows an additional exemplary embodiment of a GUI.

The tracking system may provide functionality to user with a coach user role. Coaches may be user that interact with and support a number of athletes organized into teams. A coach may search for athletes involved in sports with which the coach has expertise. The tracking system may provide various searching functions. For example, a coach may use a general athlete search interface to find athletes involved in a sport or sports in which they have expertise:

FIG. 14 shows an exemplary embodiment of a GUI 1400, which may be a tracking object index GUI displayed using a computer system such as exemplary computer system 300. GUI 1400 includes a GUI element 402, a GUI element 604, a GUI element 606, a GUI element 608, a GUI element 610, a GUI element 612, a GUI element 1402, a GUI element 1404, a GUI element 1406, a GUI element 1408, a GUI element 1410, a GUI element 1412, and a GUI element 1414.

In some embodiments, GUI element 1402 may present a search bar presenting the ability to type in a search query and then providing search results. GUI element 1404 may present a scrolling selector menu including options for challenges, forum, users, and teams. GUI element may be configured to present a calendar pop-up date range selection element. GUI element 1408 may provide a drop-down element for selecting teams and GUI element 1210 may present drop down menu items for the teams. GUI element 1411 provide users elements, which include options to open user pages or team pages.

In some embodiments, a coach may use a challenge index or search interface to identify prospective athletes for a team. The tracking system may automatically match athletes to coaches, for example, using heuristic or probabilistic, such as machine learning, algorithms to identify coach-athlete relationships which may be beneficial. For example, the tracking system may provide, for example, keyword search or filtering means to facilitate the process of identifying athletes by coaches. Search fields or filters may include, for example, the sport in which the athlete is involved, keywords that identify challenges by title, geographic limitations, such as countries or states, or other search criteria.

Coaches may request recruitment of athletes. Once a coach has identified a prospective athlete for one of the coach's teams, the coach may submit a recruitment request for that athlete to the tracking system. The request may include information relevant to the coach's qualifications and interest in working with the athlete. In some embodiments, recruitment requests are submitted to the back end of the tracking system for review by an administrator. The tracking system may prompt the administrator to take into account factors such as the coach's reasons for the recruitment request, the appropriateness of the match between the athlete's and coach's skills, for example, with a match score calculated by the tracking system, whether or not the athlete is currently engaged with another coach and/or team, or other criteria.

In some embodiments, athletes may change coaches. If an athlete is currently on another team, for example, has another coach, an administrator user may initiate communication between the existing and prospective coach to facilitate and enable appropriate matching for the athlete. For example, the administrator may notify the athlete's current coach that another coach is interested in recruiting the athlete. In this scenario, the tracking application may provide communication between the two coaches to communicate, for example, via direct message, and the tracking system may allow the coaches to mutually decide whether or not it is appropriate for the athlete to have a new coaching arrangement.

In some embodiments, the system may use an algorithm to determine which coach provides a match in the best interest of the athlete. For example, the system may consider the number of athletes currently being coached by each coach, the engagement of each coach with their existing teams, the success, such as the outcome of challenges, of the athletes on each team, or other factors to determine if the new arrangement would be beneficial to the athlete. The factors may be combined using a heuristic algorithm or a probabilistic algorithm, for example, an algorithm trained to discriminate between the coaches using machine learning technology.

Athletes may be notified regarding coaching updates. When, by any of these methods, for example, administrator approval, communication between coaches, or automated, the system determines that the athlete should receive a new recruitment request, the system may send a notification to the athlete that they are being recruited. The system may then facilitate communication between the athlete and the prospective coach. The athlete and coach may be presented with GUIs that enable approval that the athlete should join the coach's team. If mutual approval is granted, the system may create an entry into the Team_members table linking the athlete with the team and the coach, as indicated by a join with the Teams table and the athlete's and coach's records in the Users table. If the athlete is terminating a relationship with an existing coach, the relevant entry may be removed from the Teams table. The Teams table may be supplemented with a status field, which may have the values, such as pending, active, rejected, terminated, etc.

A coach-athlete relationship may be promoted and facilitated by the tracking system. In some embodiments, communication, such as direct or group messages, between the coach and the athletes on their team(s) may be used to encourage athletes to participate in challenges, to submit videos or athletic skills, for example, for the Coach to analyze and give feedback, or to engage with sponsors or fans.

In some embodiments, the tracking system presents communication forums to teams. The forum may be a GUI presented to all team members of a given team and may present threaded conversations among team members and the coach. Team members may use the forum to ask questions of others, provide tips or advice, and/or encourage competition among the athletes.

In some embodiments, coaches may generate private challenges for athletes on their teams. In these challenges, external engagement may not be tracked. Instead, coaches and athletes may use private challenges to track progress against specific athletic goals, and/or encourage competition among athletes on the coach's team.

The tracking system may be configured to present to coaches to GUIs comparing their teams with other teams. For example, the system may provide a dashboard to search for other teams focusing on a particular sport, and to view the teams' performance, for example, the average athlete rank, or detailed engagement statistics, on a subset of challenges. The tracking system may present search and filtering GUI elements to facilitate the targeting of particular teams, athletes, and challenges in various GUIs.

The tracking system may be configured to allow athletes to see information, for example, challenge rankings or aggregate challenge statistics, about other athletes that are members of the same team. For example, the tracking system may present a GUI configured to present direct communication, such as direct messaging, among athletes on the same team.

The tracking system may generate formal relationships between athletes and brands where the athlete is considered a brand ambassador and may be sponsored by the brand. Similar to the methods by which coaches may recruit athletes for their teams, a brand may recruit athletes to be a brand ambassador. Similar to the coach and athlete relationship, the tracking system may enable and facilitate sponsorship relationships using a variety of methods including both manual human-mediated and automated methods.

In some embodiments, brands may search for athletes using similar search GUIs as for coach recruiting. Using search GUIs, a Brand may not wish to limit the search to athletes with skills in particular sports but may be more interested in athletes that have positive engagement statistics, for example, when competing in challenges. The tracking system may provide brands with filters for identifying athletes with positive engagement statistics. For example, the system may maintain global, for example, non-challenge-specific, statistics on the engagement and ranking of athletes. For example, the system may accumulate challenge rankings for an athlete or athletes across all of the challenges in which the athletes have participated so that a brand may search for athletes who have high global rankings, among other search criteria.

In some embodiments, sponsorship requests may be submitted to a back-end for administrator approval. Similar to a coach and athlete relationship, the system may prompt the administrator to review a sponsorship request to ensure the sponsorship provides a good match between the athlete and the brand. For example, the administrator, or an automated algorithm, may ensure that athletes do not represent more than a given number of brands. Similar to a coach and athlete relationship, a final decision as to whether to engage with the brand may be left to the athlete for approval.

Sponsorships may be accompanied by awards or prizes that the tracking system manages. Sponsorship awards or prizes may be managed similarly to challenge prizes, and may consist of digital payments, tokens, gift cards, merchandise, or other remuneration.

In some embodiments, a Brand_administrators table may be used to indicate brand users that have the authority to initiate sponsorship requests, challenges, and/or to communicate with athletes. Brand users which have entries in this table, for example, a join table with User_id and Brand_id, may have these permissions, whereas other brand users may simply have the ability to view challenge rankings, athlete pages, analytics dashboard, etc. In some embodiments, an administrator may give direct authority to a brand user to create challenges or recruit athletes as brand ambassadors. This authority may be implemented using a Boolean field on the Brand_administrators table.

In some embodiments, the tracking system prompts fans to interact with the tracking system by finding athletes to support. For example, the system may allow fans to search for athletes that participate in a particular sport, or that are involved in certain challenges, or that are on a given team.

In some embodiments, fans may send gifts to athletes that they are supporting. For example, a fan may provide digital tokens to athletes. These tokens may be redeemable in the application for equipment, gift cards, or other remuneration. Upon receiving a gift from a fan, the athlete may be notified of the gift and the athlete may be presented with a GUI that enables them to communicate a message to the fan to thank them.

Fans may also provide comments, likes, shares, trackbacks, views, and other indications of engagement with the athletes. In some embodiments, tracking of these engagement metrics will enable identification of some fans as superfans, and superfan status may be highlighted in a GUI of the tracking system, for example, on athlete pages, or on fan pages, using indicators such as badges. A superfan may receive other benefits, such as increased opportunity to communicate with other users, including athletes, coaches, and brands, as well as opportunities to be sponsored directly by Brands, in a similar way as athletes receive sponsorships.

The tracking system may present reporting dashboards and analytics to users. In some embodiments, the tracking system may present a GUI with a global ranking of teams, coaches, and athletes which may be computed using aggregated challenge statistics. The ranking may be displayed in leader boards available to users, such as fans, administrators, or brands.

Figure 15:
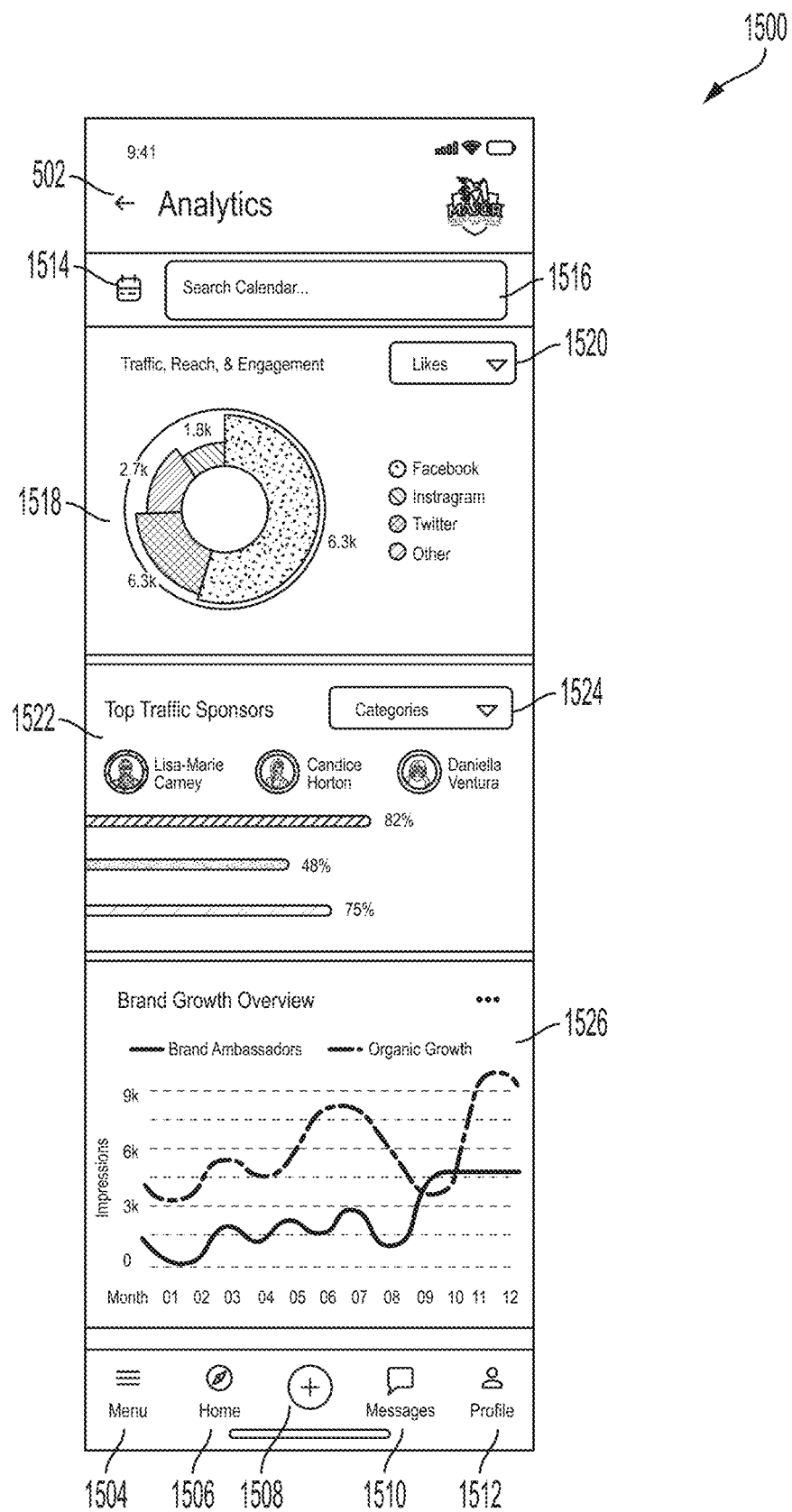
FIG. 15 shows an additional exemplary embodiment of a GUI.

FIG. 15 shows an exemplary embodiment of a GUI 1500, which may be a tracking object analytics GUI displayed using a computer system such as exemplary computer system 300. GUI 1500 includes a GUI element 402, a GUI element 1504, a GUI element 1506, a GUI element 1508, a GUI element 1510, a GUI element 1512, a GUI element 1514, a GUI element 1516, a GUI element 1518, a GUI element 1520, a GUI element 1522, a GUI element 1524, and a GUI element 1526.

In various embodiments, aggregations may be computed in a number of ways. For example, a team ranking on dashboard may be computed as an average score and/or rank of the team's individual athletes on all or some of the challenges in which the athletes are participating, or in which the athletes have participated over a given time range. In some embodiments, a ranking may be based on a weighted average of athlete rankings, where the weight is proportional to the number of athletes participating in each challenge, for example, using a normalized scale factor that is the inverse of the number of total athletes participating in the set of challenges.

The tracking system may virtually gate a leaderboard GUI based on user role to provide a customized GUI for each user role. For example, athletes may have a "You" selectable GUI element that is configured to display to the athlete their own rank in various challenges. Non athlete users may not be provided with such a "You" element. In some embodiments, coaches will have a GUI that aggregates the coach's position on multiple leaderboards and presents this aggregated ranking against that of other coaches that are involved in a same sport.

Collectively comprising a brand navigation element, GUI element 1504 may be configured to open a brand side menu, GUI element 1506 may be configured to open a brand home, GUI element 1508 may be configured to open a brand create GUI, GUI element 1510 may be configured to open a brand messages GUI, and GUI element 612 may be configured to open a brand profile GUI. GUI element 1514 may be configured to present a calendar pop-up date range selection element. GUI element 1516 may provide a challenge searching element. GUI element 1518 may present traffic, reach, and engagement analytics, with GUI element 1520 providing a selector drop-down for said analytics. GUI element 1522 may present traffic and/or sponsor information such as top traffic sponsors, and GUI element 1524 may present a selector drop down for said traffic and/or sponsor information. GUI element 1526 may be configured to present brand growth information, for example growth of brand ambassadors and/or organic growth for the brand.

In various embodiments, GUIs described herein may be presented in different languages. While exemplary GUIs provided in the description may be in English, it should be appreciated that all GUIs may be translated into other languages to support international deployment of methods described herein. For example, in some embodiments, a computer system may use machine translation means provided in a CSS language to translate the GUI to another language, for example, by setting a global language property for the application or by allowing users to select a language via a pull-down menu or checkbox. Further, communication among users, for example, between athletes and coaches, or between athletes and brands, or among athletes, may be translated to a user's selected language, which may comprise a user's native language. User communication translation may be provide using machine translation in some embodiments.

Also, various inventive concepts may be embodied as one or more processes, of which examples (for example, FIGS. 1 and 2) are provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B." when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B." or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The terms "approximately," "about," and "substantially" may be used to mean within ±20% of a target value in some embodiments, within ±10% of a target value in some embodiments, within ±5% of a target value in some embodiments, within ±2% of a target value in some embodiments. The terms "approximately," "about," and "substantially" may include the target value.

Having thus described several aspects of at least one embodiment, it is to be appreciated that various alterations, modifications, and improvements will readily occur to those skilled in the art. Such alterations, modifications, and improvements are intended to be part of this disclosure and are intended to be within the spirit and scope of the principles described herein. Accordingly, the foregoing description and drawings are by way of example only.

What is claimed is:

1. A tracking system, the tracking system comprising:
at least one processor operatively connected to a memory;
an authorization component, executed by the at least one processor, configured to:
accept definitions of user authorization objects for a set of verified users, each user authorization object including a linkage between a user role and a data element specifying an authorization attribute;
a restriction component, executed by the at least one processor, configured to:
identify, based on the user authorization objects, from the set of verified users, a first subset of the verified users having a first user role, the first user role having a linkage with a first authorization attribute specifying an access to generate tracking objects each including one or more progression metrics; and responsive to user input in a user interface and based on the user authorization objects, restrict access to functions executed on the system that are configured to generate the tracking objects to the first subset of the verified users having the first user role having the linkage with the first authorization attribute specifying the access to generate tracking objects;

a listing component, executed by the at least one processor, configured to:

responsive to user input in the user interface by the first subset of the verified users having the first user role to which access is restricted, generate tracking objects each including one or more progression metrics; and list tracking objects each including one or more progression metrics at a listing index accessible by a second subset of the verified users having a second user role, the second user role having a linkage with a second authorization attribute specifying an access to enroll with tracking objects; and a tracking component, executed by the at least one processor, configured to:

update tracking objects based on collection of metric values of respective verified users of the second subset of the verified users having the second user role for respective progression metrics.

2. The tracking system of claim 1, wherein restricting access to the functions executed on the system that are configured to generate the tracking objects comprises:

presenting, in a graphical user interface (GUI), a virtual gate to users not having the first user role, the virtual gate comprising a GUI view configured to obscure, in visualizations of the GUI, access to the functions executed on the system that are configured to generate the tracking objects.

3. The tracking system of claim 1, wherein updating tracking objects based on collection of user metrics of respective verified users of the second subset of the verified users having the second user role for respective progression metrics comprises:

prompting the second subset of the verified users having the second user role to input the metric values for the respective progression metrics; and verifying the inputted metric values for the respective progression metrics.

4. The tracking system of claim 3, wherein verifying the inputted metric values for the respective progression metrics comprises:

prompting the second subset of the verified users having the second user role to input videos associated with the inputted metric values; and analyzing the inputted videos to validate the inputted metric values.

5. The tracking system of claim 1, wherein updating tracking objects based on collection of user metrics of respective verified users of the second subset of the verified users having the second user role for respective progression metrics comprises:

calculating, based on interactions by a third subset of the verified users having a third user role, an engagement score for the second subset of the verified users having the second user role, wherein the third user role has a linkage with a third authorization attribute.

6. The tracking system of claim 5, wherein the tracking component is further configured to:

present the engagement score for the second subset of the verified users having the second user role to a fourth subset of the verified users having a fourth user role, the fourth user role having a linkage with a fourth authorization attribute, the fourth authorization attribute having a linkage with a respective brand.

7. The tracking system of claim 6, wherein:

the fourth authorization attribute specifies an access for the fourth subset of the verified users having the fourth user role to engage a user of the second subset of the verified users having the second user role to be a brand ambassador of the respective brand.

8. The tracking system of claim 1, wherein the authorization component is further configured to:

generate the user authorization objects for verified users, each user authorization object including the linkage between the user role and the data element specifying an authorization attribute, comprising:

collecting user credentials indicating a user has an association with an athletic organization; and validating the user credentials.

9. A method for implementation by a tracking system, the method comprising:

accepting definitions of user authorization objects for a set of verified users, each user authorization object including a linkage between a user role and a data element specifying an authorization attribute;

identifying, based on the user authorization objects, from the set of verified users, a first subset of the verified users having a first user role, the first user role having a linkage with a first authorization attribute specifying an access to generate tracking objects each including one or more progression metrics;

responsive to user input in a user interface and based on the user authorization objects, restricting access to functions executed on the system that are configured to generate the tracking objects to the first subset of the verified users having the first user role having the linkage with the first authorization attribute specifying the access to generate tracking objects;

responsive to user input in the user interface by the first subset of the verified users having the first user role to which access is restricted, generating tracking objects each including one or more progression metrics;

listing tracking objects each including one or more progression metrics at a listing index accessible by a second subset of the verified users having a second user role, the second user role having a linkage with a second authorization attribute specifying an access to enroll with tracking objects; and updating tracking objects based on collection of metric values of respective verified users of the second subset of the verified users having the second user role for respective progression metrics.

10. The method of claim 9, wherein restricting access to the functions executed on the system that are configured to generate the tracking objects comprises:

presenting, in a graphical user interface (GUI), a virtual gate to users not having the first user role, the virtual gate comprising a GUI view configured to obscure, in visualizations of the GUI, access to the functions executed on the system that are configured to generate the tracking objects.

11. The method of claim 9, wherein updating tracking objects based on collection of user metrics of respective verified users of the second subset of the verified users having the second user role for respective progression metrics comprises:
  prompting the second subset of the verified users having the second user role to input the metric values for the respective progression metrics; and
  verifying the inputted metric values for the respective progression metrics.

12. The method of claim 11, wherein verifying the inputted metric values for the respective progression metrics comprises:
  prompting the second subset of the verified users having the second user role to input videos associated with the inputted metric values; and
  analyzing the inputted videos to validate the inputted metric values.

13. The method of claim 9, wherein updating tracking objects based on collection of user metrics of respective verified users of the second subset of the verified users having the second user role for respective progression metrics comprises:
  calculating, based on interactions by a third subset of the verified users having a third user role, an engagement score for the second subset of the verified users having the second user role, wherein the third user role has a linkage with a third authorization attribute.

14. The method of claim 13, further comprising:
  presenting the engagement score for the second subset of the verified users having the second user role to a fourth subset of the verified users having a fourth user role, the fourth user role having a linkage with a fourth authorization attribute, the fourth authorization attribute having a linkage with a respective brand.

15. The method of claim 14, wherein:
  the fourth authorization attribute specifies an access for the fourth subset of the verified users having the fourth user role to engage a user of the second subset of the verified users having the second user role to be a brand ambassador of the respective brand.

16. The method of claim 9, further comprising:
  generating the user authorization objects for verified users, each user authorization object including the linkage between the user role and the data element specifying an authorization attribute, comprising:
    collecting user credentials indicating a user has an association with an athletic organization; and
    validating the user credentials.

17. At least one non-transitory computer-readable storage medium having instructions encoded thereon that, when executed by at least one processor of a tracking system, cause the at least one processor to perform a method comprising:
  accepting definitions of user authorization objects for a set of verified users, each user authorization object including a linkage between a user role and a data element specifying an authorization attribute;
  identifying, based on the user authorization objects, from the set of verified users, a first subset of the verified users having a first user role, the first user role having a linkage with a first authorization attribute specifying an access to generate tracking objects each including one or more progression metrics;
  responsive to user input in a user interface and based on the user authorization objects, restricting access to functions executed on the system that are configured to generate the tracking objects to the first subset of the verified users having the first user role having the linkage with the first authorization attribute specifying the access to generate tracking objects;
  responsive to user input in the user interface by the first subset of the verified users having the first user role to which access is restricted, generating tracking objects each including one or more progression metrics;
  listing tracking objects each including one or more progression metrics at a listing index accessible by a second subset of the verified users having a second user role, the second user role having a linkage with a second authorization attribute specifying an access to enroll with tracking objects; and
  updating tracking objects based on collection of metric values of respective verified users of the second subset of the verified users having the second user role for respective progression metrics.

18. The at least one non-transitory computer-readable storage medium of claim 17, wherein restricting access to the functions executed on the system that are configured to generate the tracking objects comprises:
  presenting, in a graphical user interface (GUI), a virtual gate to users not having the first user role, the virtual gate comprising a GUI view configured to obscure, in visualizations of the GUI, access to the functions executed on the system that are configured to generate the tracking objects.

19. The at least one non-transitory computer-readable storage medium of claim 17, wherein updating tracking objects based on collection of user metrics of respective verified users of the second subset of the verified users having the second user role for respective progression metrics comprises:
  prompting the second subset of the verified users having the second user role to input the metric values for the respective progression metrics; and
  verifying the inputted metric values for the respective progression metrics.

20. The at least one non-transitory computer-readable storage medium of claim 19, wherein verifying the inputted metric values for the respective progression metrics comprises:
  prompting the second subset of the verified users having the second user role to input videos associated with the inputted metric values; and
  analyzing the inputted videos to validate the inputted metric values.

* * * * *